US010106090B2

(12) United States Patent
Ito

(10) Patent No.: US 10,106,090 B2
(45) Date of Patent: Oct. 23, 2018

(54) FOLDABLE HOLDING DEVICE IN FLOORBOARD

(71) Applicant: Yuzuru Ito, Plymouth, MI (US)

(72) Inventor: Yuzuru Ito, Plymouth, MI (US)

( * ) Notice: Subject to any disclaimer, the term of this patent is extended or adjusted under 35 U.S.C. 154(b) by 62 days.

(21) Appl. No.: 15/343,534

(22) Filed: Nov. 4, 2016

(65) Prior Publication Data

US 2017/0129410 A1    May 11, 2017

Related U.S. Application Data

(60) Provisional application No. 62/311,855, filed on Mar. 22, 2016, provisional application No. 62/253,215, filed on Nov. 10, 2015.

(51) Int. Cl.
*B60R 7/02* (2006.01)
*B60R 5/04* (2006.01)
*B65D 6/16* (2006.01)

(52) U.S. Cl.
CPC .................. *B60R 7/02* (2013.01); *B60R 5/04* (2013.01); *B65D 11/18* (2013.01)

(58) Field of Classification Search
CPC  B60R 5/04; B60R 5/044; B60R 5/045; B60R 7/02
USPC .......................... 296/24.4, 37.5, 37.14, 37.16
See application file for complete search history.

(56) References Cited

U.S. PATENT DOCUMENTS

| 4,091,852 A | 5/1978 | Jordan et al. |
| 6,290,277 B1 | 9/2001 | Spykerman et al. |
| 6,308,873 B1 | 10/2001 | Baldas et al. |
| 7,201,421 B2 | 4/2007 | Reynolds et al. |
| 8,215,693 B2 | 7/2012 | Ulita |
| 8,789,715 B2 | 7/2014 | Shea et al. |
| 2015/0175080 A1 | 6/2015 | Kmita et al. |
| 2016/0229347 A1 | 8/2016 | Warnecke |

FOREIGN PATENT DOCUMENTS

| DE | 10108338 A1 | 8/2002 |
| DE | 10110335 A1 | 9/2002 |
| DE | 10-2012-004183 A1 | 9/2013 |
| EP | 0983902 A2 | 3/2000 |
| JP | S60-52139 U | 4/1985 |

*Primary Examiner* — Jason S Daniels
(74) *Attorney, Agent, or Firm* — Harness, Dickey & Pierce, P.L.C.

(57) ABSTRACT

A foldable holding device that is provided in a floorboard, the foldable holding device including: a housing recess; a raisable top panel that fits into the housing recess while the raisable top panel is housed; a side panel foldably connected to one of side edges of the raisable top panel such that as the raisable top panel is raised, the side panel outwardly moves to form the foldable holding device in an open state; first and second holding sub-members respectively provided in the housing recess and at a position located directly adjacent to a lower edge of the side panel, and the first and second holding sub-members being configured to maintain a raised position of the side panel by engaging the first holding sub-members and the second holding sub-members to each other.

19 Claims, 43 Drawing Sheets

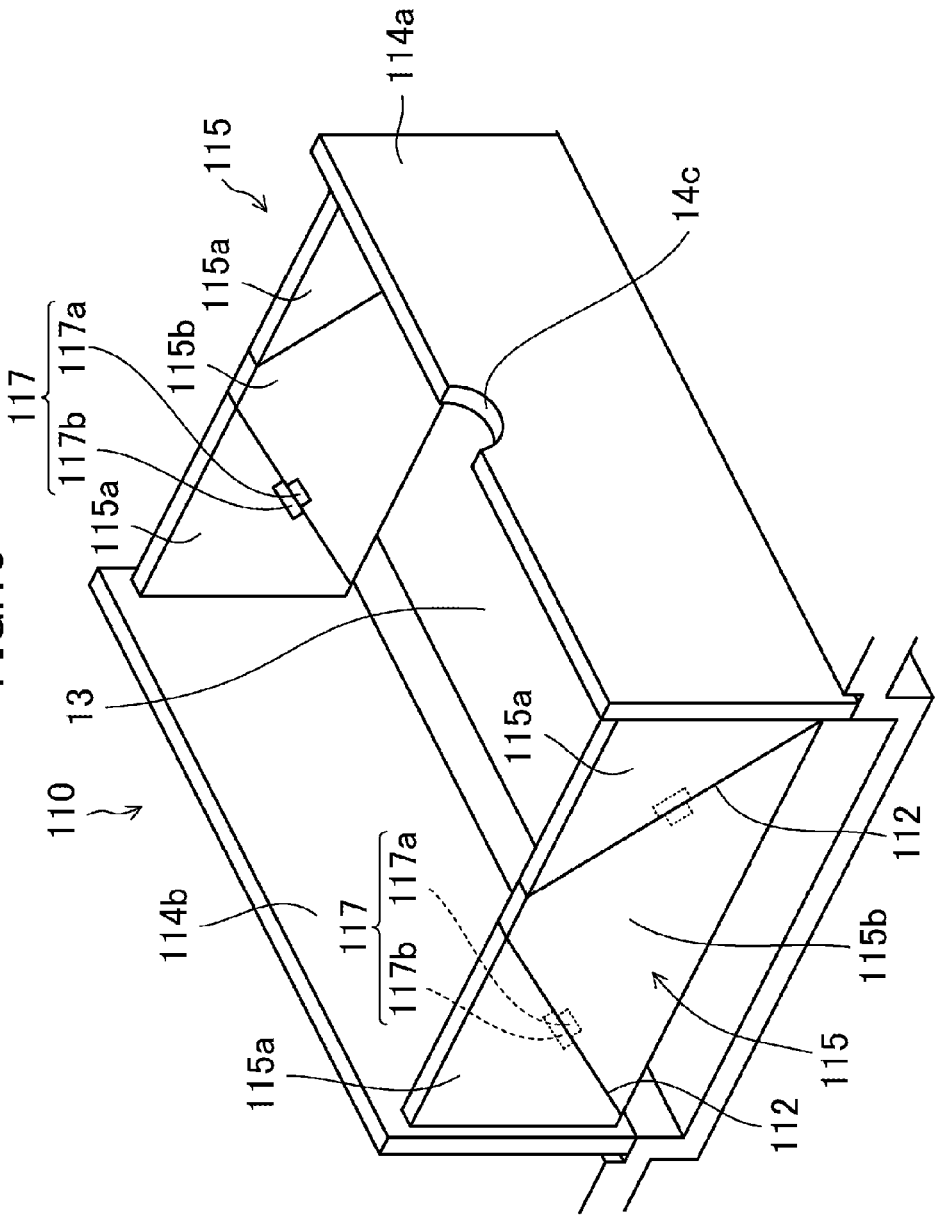

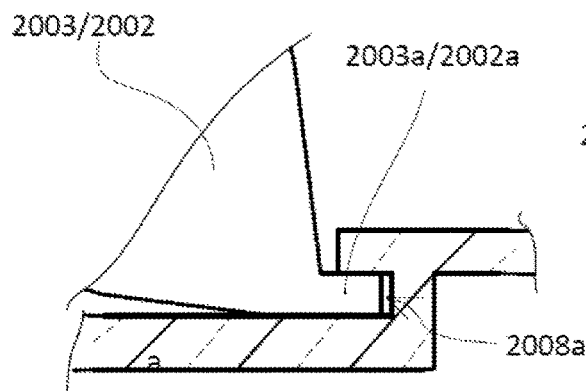
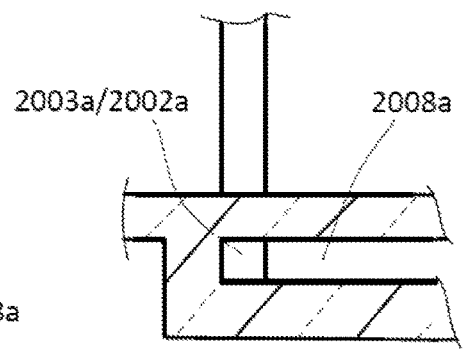
(a-a')  (b-b')
Fig. 55A  Fig. 55B
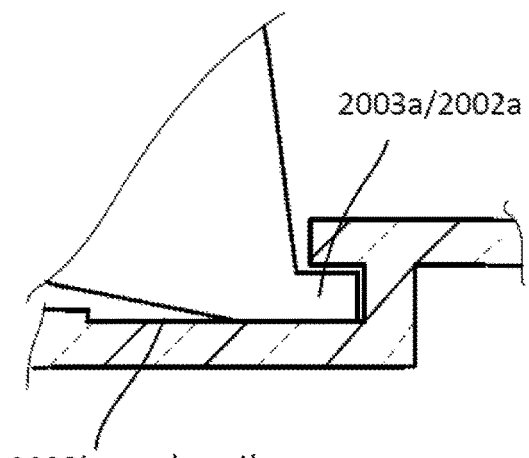
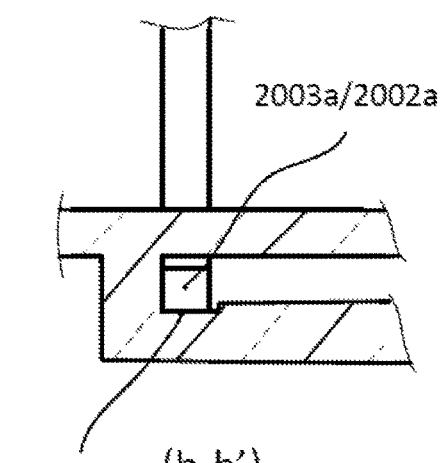
(a-a')  (b-b')
Fig. 56A  Fig. 56B

FOLDABLE HOLDING DEVICE IN FLOORBOARD

CROSS-REFERENCE TO RELATED APPLICATION

This application claims priority to Provisional Patent Application Nos. 62/253,215 filed Nov. 10, 2015, and 62/311,855 filed Mar. 22, 2016 which are hereby expressly incorporated by reference herein in their entirety.

BACKGROUND

The present invention relates to a foldable holding device in a floorboard of a vehicle used in in a trunk or a luggage compartment of an automobile, such as a sedan, SUV, station wagon, or a mini-van. The foldable holding device can be added onto the floorboard of a trunk or a luggage compartment of an automobile as an after-market product. The foldable holding device can also be built into the floorboard of a trunk or a luggage compartment of an automobile. The holding device according to the present application can hold grocery or shopping bags and other goods to prevent them from freely moving in a trunk or a luggage compartment of an automobile.

Conventionally, as in Japanese Utility Model Publication No. S60-52139, a floorboard having a foldable holding device is known in which a rectangular hole is cut out in a carpet body and a box-shaped container is configured in a location facing that hole such that each of the two side edges of the fitted compartment walls is connected by means of flexible material.

However, with the conventional floorboards having a foldable holding device made of the flexible material, although convenient for folding and suitable for storage, when its compartment walls are raised and to form a box-shaped container, its strength is low and a sufficient amount of luggage or goods cannot be held.

On the other hand, when flexible material parts also make up the compartment walls, to maintain a raised position (a raised state) of the four edges of the compartment walls, the adjacent compartment walls must be fastened to each other with hooks or the like, and it becomes bothersome to assemble the walls into a container shape.

SUMMARY

The present invention was made while giving full consideration to these points and one of its objects is to provide a holding device that is easily raisable into the container-shaped state and that can securely maintain that container-shaped state. Therefore, a holding device according to the present application can hold grocery or shopping bags and other goods therein to prevent them from freely moving in a trunk or a luggage compartment of an automobile.

In order to achieve the above object, one aspect of the present invention is directed to a foldable holding device that is provided in a floorboard of a vehicle, the foldable holding device including: a housing recess that is provided in the floorboard; a raisable top panel that fits into the housing recess while the raisable top panel is housed in the housing recess, the raisable top panel having an upper edge, a lower edge and side edges; a pair of side panels foldably connected to the side edges of the raisable top panel, respectively, such that as the raisable top panel is raised, the pair of side panels moves to mutually opposed positions to form, together with the raisable top panel, the foldable holding device in an open state; first and second side panel holding members, each of the first and second side panel holding members having first and second holding sub-members, the first holding sub-members being provided in the housing recess, each of the second holding sub-members being provided at a position located directly adjacent to a lower edge of each of the pair of side panels, and the first and second side panel holding members being configured to maintain a raised position of the pair of side panels by engaging the first holding sub-members and the second holding sub-members to each other. Note that this aspect is not limited to the above pair of side panels. As discussed later, at least one side panel is required for the foldable holding device.

In the foldable holding device, each of the side edges of the raisable top panel and each of the pair of side panels is connected by a spring that outwardly moves each of the pair of side panels as the raisable top panel is raised. Note that this aspect is not limited to the above pair of side panels. As discussed later, at least one side panel is required for the foldable holding device.

In the foldable holding device, each of the first holding sub-members is a projection that is inwardly projected from a side wall of the housing recess, and each of the second holding sub-members is a through hole through which the projection is inserted when the foldable holding device is in the open state. Note that this aspect is not limited to the above pair of side panels. As discussed later, at least one side panel is required for the foldable holding device.

In the foldable holding device, each of the first holding sub-members is one of a magnet and a magnet-attractable fitting, each of the second holding sub-members is the other of the magnet and the magnet-attractable fitting, and when the foldable holding device is in the open state, the magnet and the magnet-attractable fitting are contacted to each other so as to maintain the open state of the foldable holding device. Note that this aspect is not limited to the above pair of side panels. As discussed later, at least one side panel is required for the foldable holding device.

In the foldable holding device, each of the first holding sub-members is a floorboard slot that is provided in a side wall of the housing recess, each of the second holding sub-members is a projection that is provided at a bottom of a side edge of each of the pair of side panels, and the side edge of each of the pair of side panels is located at a farthest position from the raisable top panel in the open state, and the projection slidably moves into the floorboard slot when each of the pair of side panels outwardly moves to form, together with the raisable top panel, the foldable holding device in the open state. Note that this aspect is not limited to the above pair of side panels. As discussed later, at least one side panel is required for the foldable holding device.

In the foldable holding device, each of the first holding sub-members is a support shaft that is provided in the housing recess and that extends parallel to a side wall of the housing recess, each of the second holding sub-members is a through hole that is provided at a bottom portion of a lower edge of each of the pair of side panels, a through hole extending direction of the through hole is perpendicular to the lower edge of the raisable top panel, and the support shaft is located in the through hole, when each of the pair of side panels is raised by rotating with respect to the support shaft, together with the raisable top panel, the foldable holding device is in the open state. Note that this aspect is not limited to the above pair of side panels. As discussed later, at least one side panel is required for the foldable holding device.

The foldable holding device further includes a plurality of leg-holding members that are provided in the housing recess. The raisable top panel having a plurality of legs that are continuously and outwardly formed from the lower edge of the raisable top panel so that a top surface of the raisable top panel, a top surface of the plurality of legs and a top surface of the floorboard form a planar surface while the raisable top panel is housed in the housing recess, and the plurality of leg-holding members respectively hold the plurality of legs as the raisable top panel is raised.

The foldable holding device further includes a plurality of leg-holding members that are provided in the housing recess. Each of the pair of side panels having a plurality of legs that are continuously and outwardly formed from the lower edge of each of the pair of side panels, and the plurality of leg-holding members respectively hold the plurality of legs as the raisable top panel is raised. Note that this aspect is not limited to the above pair of side panels. As discussed later, at least one side panel is required for the foldable holding device.

Another aspect of the present invention is directed to a foldable holding device that is provided in a floorboard of a luggage compartment, the foldable holding device including: a housing recess that is provided in the floorboard; a raisable pair of top panels that fit into the housing recess while the raisable pair of top panels are housed in the housing recess, the raisable pair of top panels stand when the raisable pair of top panels are outwardly opened from top edges of the raisable pair of top panels, each of the raisable pair of top panels having side edges connected between top and lower edges; a pair of side panels respectively and foldably connected to at least one of the side edges of each of the raisable pair of top panels so that as the raisable pair of top panels are raised, the pair of side panels moves to mutually opposing positions to form the holding device into a rectangular parallelepiped shape in the plan view, each lower edge of the pair of side panels being swingably supported by the floorboard so that the pair of side panels stand when the raisable pair of top panels are outwardly opened from the top edges of the raisable pair of top panels; and first and second side panel holding members, each of the first and second side panel holding members having first and second holding sub-members, the first holding sub-members being provided in the housing recess, each of the second holding sub-members being provided at a position located directly adjacent to the lower edge of each of the pair of side panels, and the first and second side panel holding members being configured to maintain a raised position of the pair of side panels by engaging the first holding sub-members and the second holding sub-members to each other. One of the pair of side panels is configured with: a first pair of triangular side panels that are generally triangularly shaped, a first edge of each of the first pair of triangular side panels being foldably connected to one of the side edges of each of the raisable pair of top panels, respectively; a second triangular side panel, two edges of the second triangular side panel being respectively and foldably connected to two of second edges of the first pair of triangular side panels, and a lower edge of the second triangular side panel forms the lower edge of each of the pair of side panels; and mating surfaces of the first pair of triangular side panels and the second triangular side panel being provided with a raised-position support component. The first and second holding sub-members are magnets and magnet-attractable fittings.

In the foldable holding device, each of the first pair of triangular side panels has one of a magnet and a magnet-attractable fitting, and when the pair of side panels are housed in the housing recess, the one of the magnet and the magnet-attractable fitting magnetically contacts to the second holding sub-member provided at the second triangular side panel.

Another aspect of the present invention is directed to a foldable holding device that is provided in a floorboard of a luggage compartment, the foldable holding device including: a housing recess that is provided in the floorboard, the housing recess having a plurality of housing leg members, the plurality of housing leg members extending from a side wall of the housing recess toward a center of the housing recess in a plan view, an extending direction being parallel to a bottom of the housing recess; a raisable pair of top panels that fit into the housing recess while the raisable pair of top panels are housed in the housing recess, the raisable pair of top panels stand when the raisable pair of top panels are outwardly opened from top edges of the raisable pair of top panels, each of the raisable pair of top panels having side edges connected between top and lower edges; a pair of side panels respectively and foldably connected to at least one of the side edges of each of the raisable pair of top panels so that as the raisable pair of top panels are raised, the pair of side panels moves to mutually opposing positions to form the holding device into a rectangular parallelepiped shape in the plan view, each lower edge of the pair of side panels being swingably supported by the floorboard so that the pair of side panels is in a stand state when the raisable pair of top panels are outwardly opened from the top edges of the raisable pair of top panels. One of the pair of side panels is configured with: a first pair of triangular side panels that are generally triangularly shaped, a first edge of each of the first pair of triangular side panels being foldably connected to one of the side edges of each of the raisable pair of top panels, respectively; a second triangular side panel, two edges of the second triangular side panel being respectively and foldably connected to two of second edges of the first pair of triangular side panels, and a lower edge of the second triangular side panel forms the lower edge of each of the pair of side panels, the second triangular side panel having a plurality of side panel leg members that continuously extends from the lower edge of the second triangular side panel; and mating surfaces of the first pair of triangular side panels and the second triangular side panel being provided with a raised-position support component. When the pair of side panels moves to mutually opposing positions to form the holding device into the rectangular parallelepiped shape in the plan view, the plurality of housing leg members and the plurality of side panel leg members engage so as to maintain the pair of side panels in the stand state.

Another aspect of the present invention is directed to a foldable holding device that is provided in a floorboard of a luggage compartment, the foldable holding device including: a housing recess that is provided in the floorboard, the housing recess having first, second, third, and fourth housing sides, the first and third housing sides being respectively opposite to the second and fourth housing sides; first and second raisable top panels that fit into the housing recess while the first and second raisable top panels are housed in the housing recess, a first lower edge of the first raisable top panel being swingably and slidably supported by a first support member provided at the first housing side of the housing recess, a second lower edge of the second raisable top panel being swingably supported by the floorboard at the second housing side of the housing recess, the first and second raisable top panels are in a stand state when the first and second raisable top panels are outwardly opened from top edges of the first and second raisable top panels, each of the first and second raisable top panels having side edges connected between one of top edges and one of the first and second lower edges; and a pair of side panels respectively and foldably connected to at least one of the side edges of each of the first and second raisable top panels so that as the first and second raisable top panels are raised, the pair of side panels moves to mutually opposing positions to form the holding device into a rectangular parallelepiped shape in a plan view. One of the pair of side panels is configured with: a first pair of triangular side panels that are generally triangularly shaped, a first edge of each of the first pair of triangular side panels being foldably connected to one of the side edges of each of the first and second raisable top panels, respectively; a second triangular side panel, two edges of the second triangular side panel being respectively and foldably connected to two of second edges of the first pair of triangular side panels, and a lower edge of the second triangular side panel forms a lower edge of each of the pair of side panels; and mating surfaces of the first pair of triangular side panels and the second triangular side panel being provided with a raised-position support component. The second raisable top panel does not slide with respect to the second housing side of the housing recess when the second raisable top panel is in the stand state.

In the foldable holding device, the raised-position support component is configured by a comb tooth member which is provided at the mating surfaces.

In the foldable holding device, the comb tooth member is configured with a tooth member and a tooth projection member and a tooth slit member, the tooth projection member and the tooth slit member are respectively formed on the mating surfaces of the first pair of triangular side panels and the mating surfaces of the second triangular side panel so that the tooth projection member engages the tooth slit member when the first and second raisable top panels are in the stand state.

In the foldable holding device, a shortest inner distance of the tooth slit member parallel to one of the mating surfaces is smaller than a tooth projection width of the tooth projection member parallel to the one of the mating surfaces.

The foldable holding device further includes a plurality of leg-holding members that are provided at the first housing side of the housing recess. The first lower edge of the first raisable top panel having a plurality of legs that are continuously and outwardly formed from the first lower edge of the first raisable top panel, and the plurality of leg-holding members respectively hold the plurality of legs as the first raisable top panel is in the stand state.

In the foldable holding device, the first support member is configured with first and second support pins and first and second support grooves, the first and second support pins slidably move in the first and second support grooves, the first and second support pins are respectively provided at first and second ends of the first lower edge of the first raisable top panel, and the first and second support pins are outwardly projected in an extending direction of the first lower edge, the first and second support grooves are respectively provided at the third and fourth housing sides of the housing recess directly adjacent to the first housing side of the housing recess, and the first and second support grooves respectively extend in a direction parallel to an extending direction of one of the third and fourth housing sides of the housing recess, and first positions of the first and second support pins when the first and second raisable top panels are in the stand state are closer to the housing recess than second positions of the first and second support pins when the first and second raisable top panels are housed in the housing recess, respectively.

In the foldable holding device, the first lower edge is round-shaped.

In the foldable holding device, the first raisable top panel is configured with a first main top panel and a pivot panel which are movably connected to each other at ends of the first main panel and the pivot panel. The first support member is configured with first and second pins and the pivot panel, the first and second support pins are respectively provided at first and second ends of a lower edge of the pivot panel, and the first and second support pins are outwardly projected in an extending direction of the lower edge of the pivot panel, the pivot panel is movably fixed to the housing recess via the first and second support pins. When the first raisable top panel is housed in the housing recess as a housing state, the pivot panel is inclined with respect to a bottom of the housing recess. When the first raisable top panel is in a position between the stand state and the housing state, the pivot panel is perpendicular to the bottom of the housing recess. When the first raisable top panel is in the stand state, the pivot panel is inclined with respect to the bottom of the housing recess.

In the foldable holding device, the pivot panel has first and second ends, the first end is connected to the first main panel, and the second end is located directly adjacent to the first and second support pins, the first end is configured with two planes, a boundary between the two planes is rotatably connected to a lower corner of the first lower edge of the first raisable top panel, and the second end is round shaped.

BRIEF DESCRIPTION OF THE DRAWINGS

FIG. 10 is a perspective view showing the holding device according to a second embodiment in the container-shaped state, with a lateral part cut away.

FIG. 23 corresponds to FIG. 11.

FIG. 26 corresponds to FIG. 10.

FIG. 30 also corresponds to FIG. 11.

FIG. 34 corresponds to FIG. 31.

FIG. 35 corresponds to FIG. 32.

FIG. 36 corresponds to FIG. 33.

FIG. 37 corresponds to FIG. 31.

FIG. 38 corresponds to FIG. 32.

FIG. 39 corresponds to FIG. 33.

FIGS. 55A and 55B are partial cross section views showing that the side panel is fixed by engaging an engagement projection of the side panel of the holding device in the raised state with a floorboard slot (a receiving channel) of a housing.

FIGS. 56A and 56B are partial cross section views showing that the side panel is fixed by engaging an engagement projection of the side panel of the holding device in the raised state with a floorboard slot (a receiving channel) of a housing and an additional recess.

DESCRIPTION OF EXEMPLARY EMBODIMENTS

Embodiments of the present invention are described below, based on the figures.

First Embodiment

Figure 1:
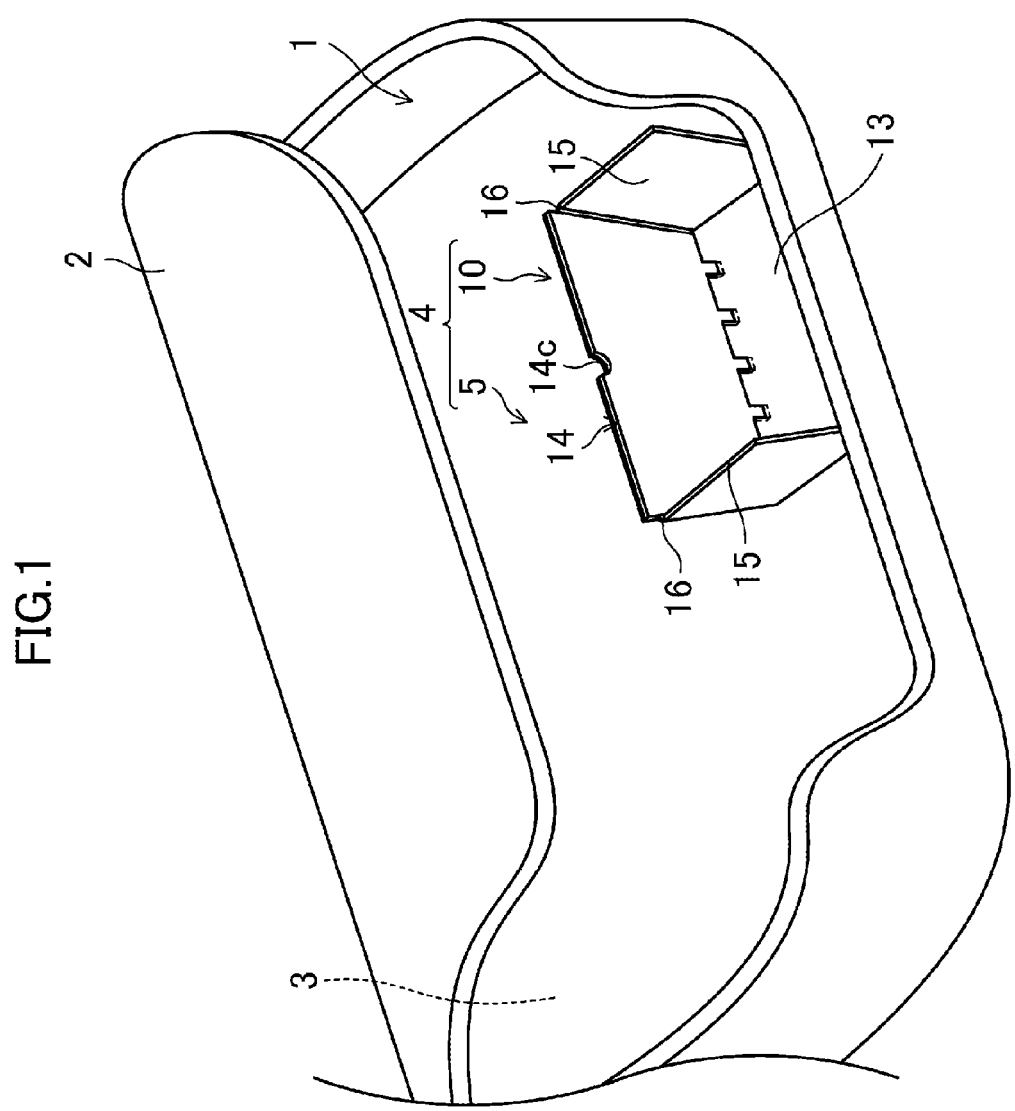
FIG. 1 is a perspective view showing a car trunk with a floorboard having a foldable holding device, which is housed in the floorboard, according to a first embodiment.

FIG. 1 shows how floorboard 4 is mounted in a luggage compartment 1 according to a first embodiment of the present invention. For example, this floorboard 4 is positioned so that it can be inserted in and removed from the floor of automobile luggage compartment 1 when its trunk lid 2 is opened. Although not shown in the figure, by lifting the floorboard 4, it is possible to remove the spare tire housed in a floor 3 which is made, for example, of metal. Furthermore, the floorboard 4 need not be made so that it can be inserted/removed, but may be of a fixed type.

Figure 8A:
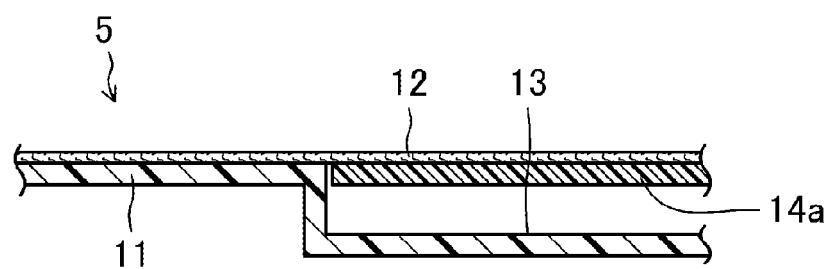
FIG. 8A is an enlarged cross section view showing the housed position along the VIII-VIII line of FIG. 4.

As shown in FIG. 8A, for example, the floorboard 4 is made of a floorboard body 5 which has a core material 11, made from a molded resin component or the like, having a carpet material 12 attached to that core material 11. For example, the carpet material 12 may be attached with an adhesive to the core material 11.

The core material 11 is almost sheet-like and is conformed to the shape of the luggage compartment 1. At its back edge, for example, a housing recess 13 is formed in the core material 11 recessed one step below the other areas thereof. The housing recess 13 is, for example, a rectangular shape when viewed from above. The bottom of the housing recess 13 may be exposed the core material 11 or may be covered in the carpet material 12.

Figure 2:
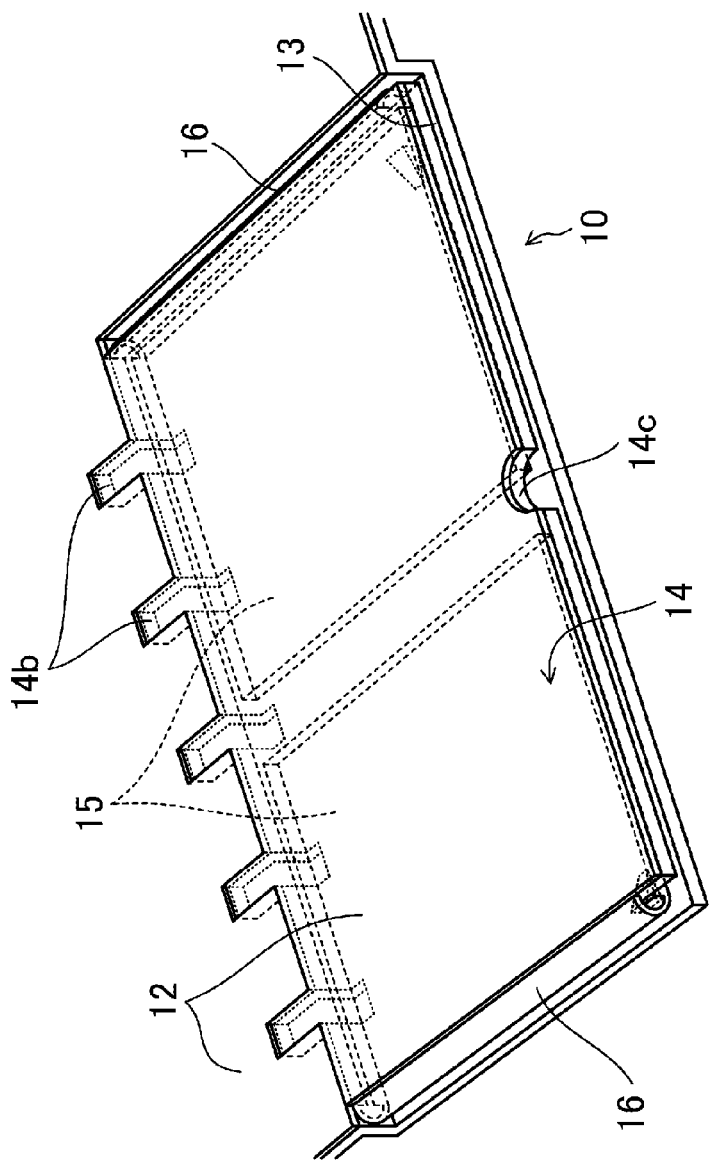
FIG. 2 is a perspective view showing a housed position of the holding device with a lateral part cut away.
Figure 3:
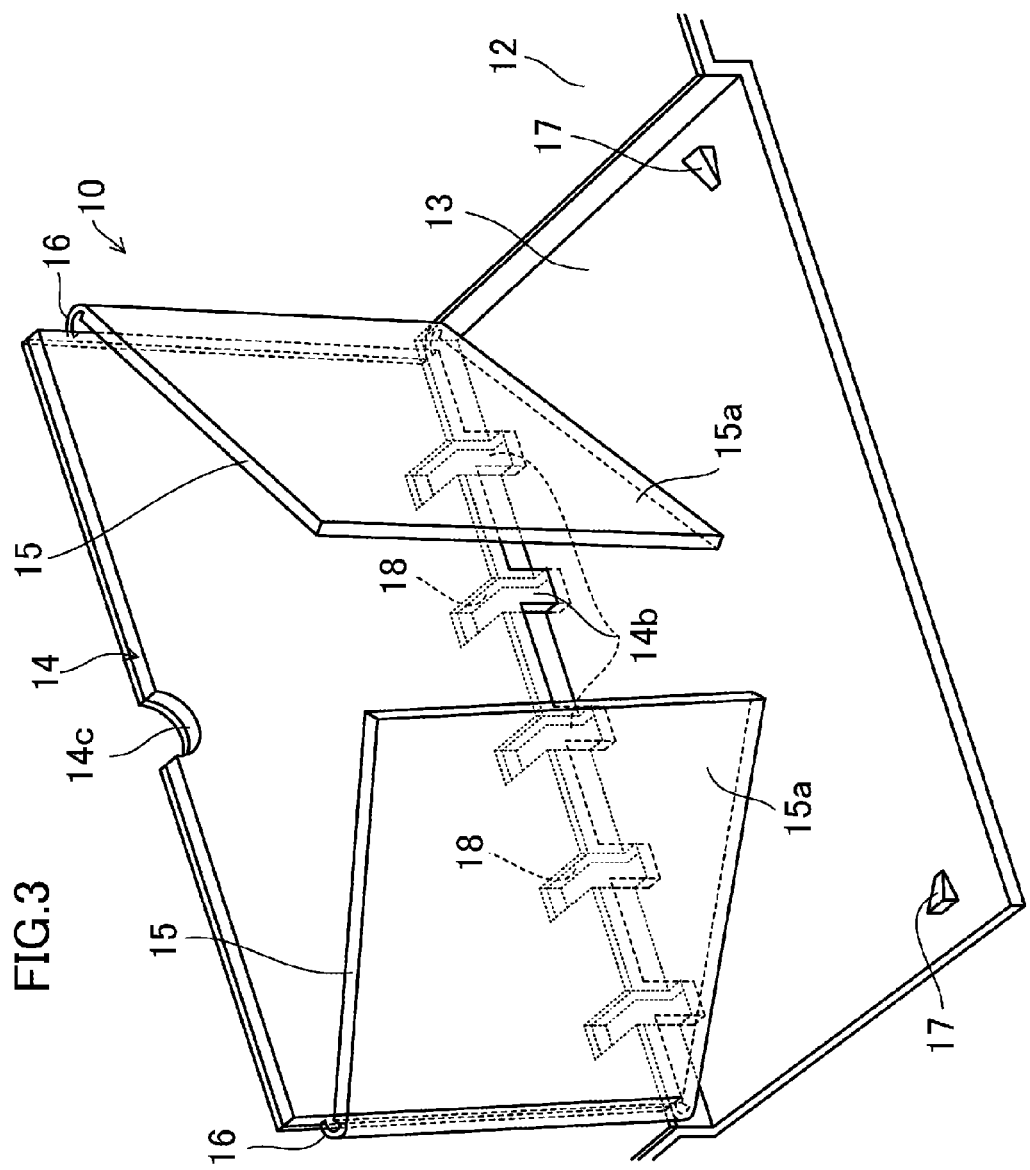
FIG. 3 is a perspective view showing the holding device while being raised, with a lateral part cut away.
Figure 4:
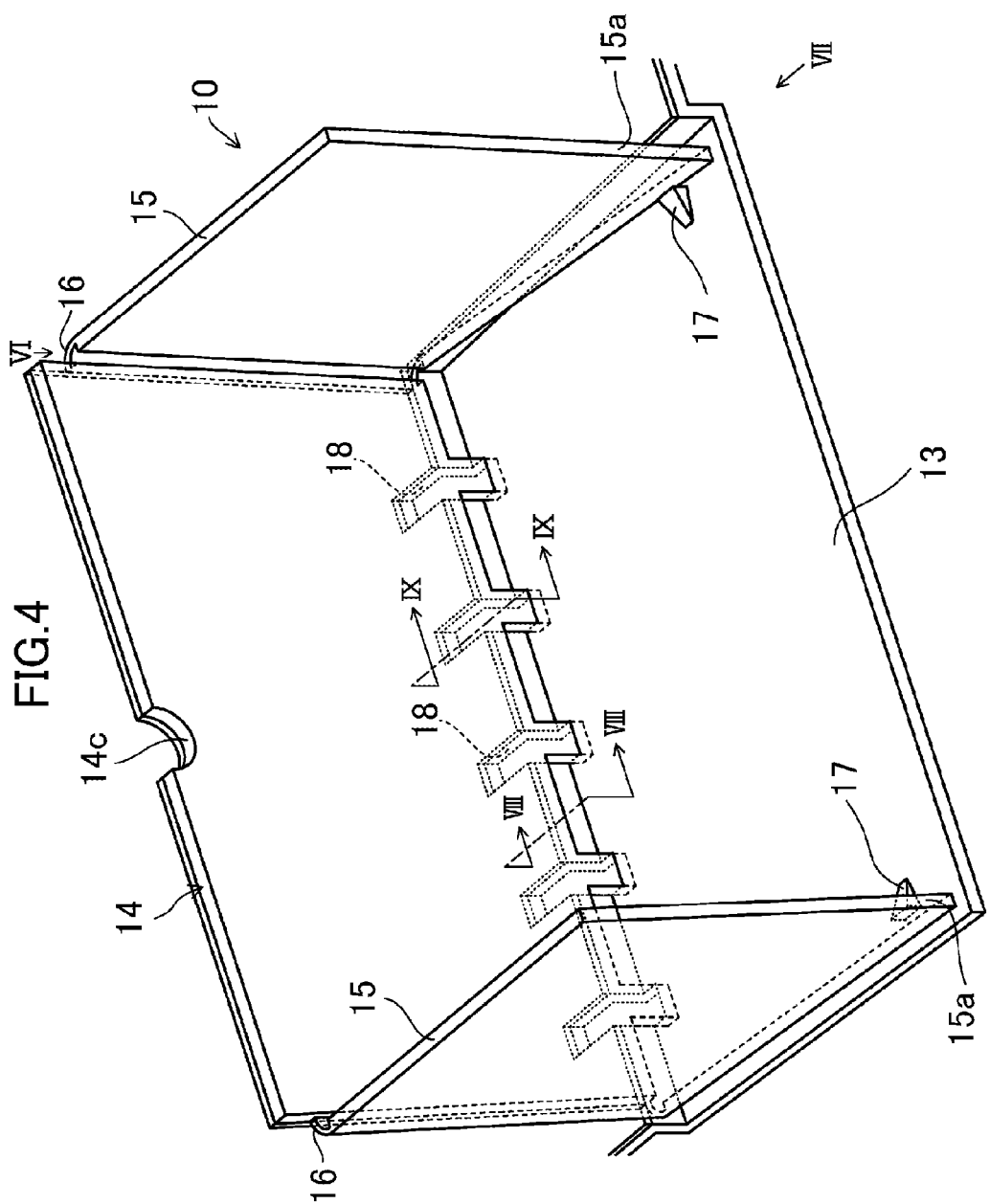
FIG. 4 is a perspective view showing the holding device in the container-shaped state, with a lateral part cut away.

The floorboard 4 is provided with the holding device 10 which can be folded into the housing recess 13. Specifically, as shown in FIG. 2 through FIG. 4, this housing recess 13 is normally covered by a raisable top panel 14, which is generally in the shape of a rectangular flat panel. The top panel 14 has a rigid core material 14a of the same material as the core material 11, and the surface side of this rigid core material 14a is covered by the carpet material 12. The top panel 14 is formed so that several legs 14b extend from its lower edge (when closed, the forward edge). There is no particular limit on the number of the legs 14b. Also, on the upper edge (when closed, the rear edge) of the top panel 14, a finger-hold point 14c, cut out in an arc-like shape, is provided to enable a finger to be inserted.

In addition, a pair of side panels 15 are foldably connected at both ends of the top panel 14 respectively. The pair of side panels 15 is formed, for example, of the same rigid material 14a as the top panel 14 and are connected integrally to the top panel 14 by a flexible hinges 16 of this rigid material 14a thinly formed. If the pair of side panels 15 is also covered by the carpet material 12, the hinges 16 may also be covered by the carpet material 12. When the top panel 14 is raised, this pair of side panels 15 is also raised to positions mutually opposing each other and together with top panel 14 form the holding device 10.

Figure 7A:
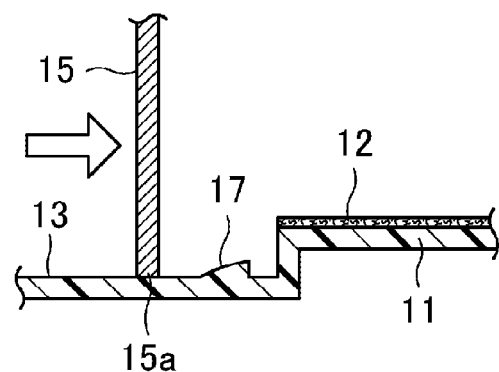
FIG. 7A is cross section view from the direction of arrow VII of FIG. 4 showing a state in which a side panel has not yet reached the side panel holding protrusion.

Also, as shown in FIG. 7A, at the right and left in the bottom of the housing recess 13, side-panel holding protrusions 17 are provided to leave a space so that when the pair of side panels 15 is raised, after the lower edge 15a of each side panel 15 passes over the respective protrusion, these side panels 15 will be held in the raised position. The side-panel holding protrusions 17 are preferably barb-shaped, for example, so that after the pair of side panels 15 pass over them, the lower edges 15a of the side panels 15 catch on them and are retained. The lower edges 15a are pinched between these side-panel holding protrusions 17 and the side walls of the housing recess 13, and become stabilized.

Figure 9A:
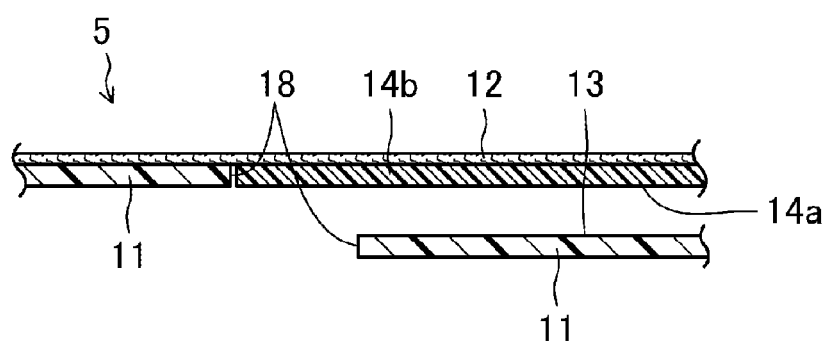
FIG. 9A is an enlarged cross section view showing the housed position along the IX-IX line of FIG. 4.
Figure 9B:
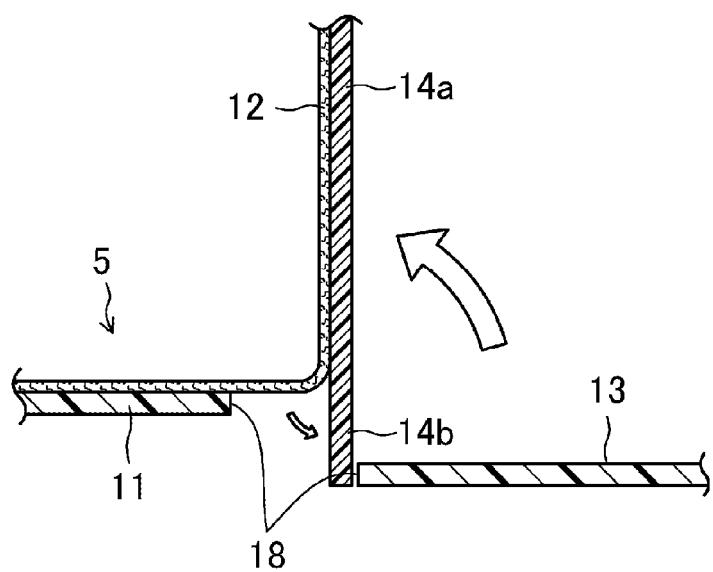
FIG. 9B is an enlarged cross section view showing the raised position along the IX-IX line of FIG. 4.

In addition, as shown in FIG. 3 and FIG. 9B, leg-holding points 18 are provided at the front-edge side of the housing recess 13 into which legs 14b protruding from the lower edge of the top panel 14 fit when the top panel 14 is raised. These leg-holding points 18 have, for example, a plurality of through-holes or recesses with bottoms provided in locations corresponding to legs 14b.

Figure 5:
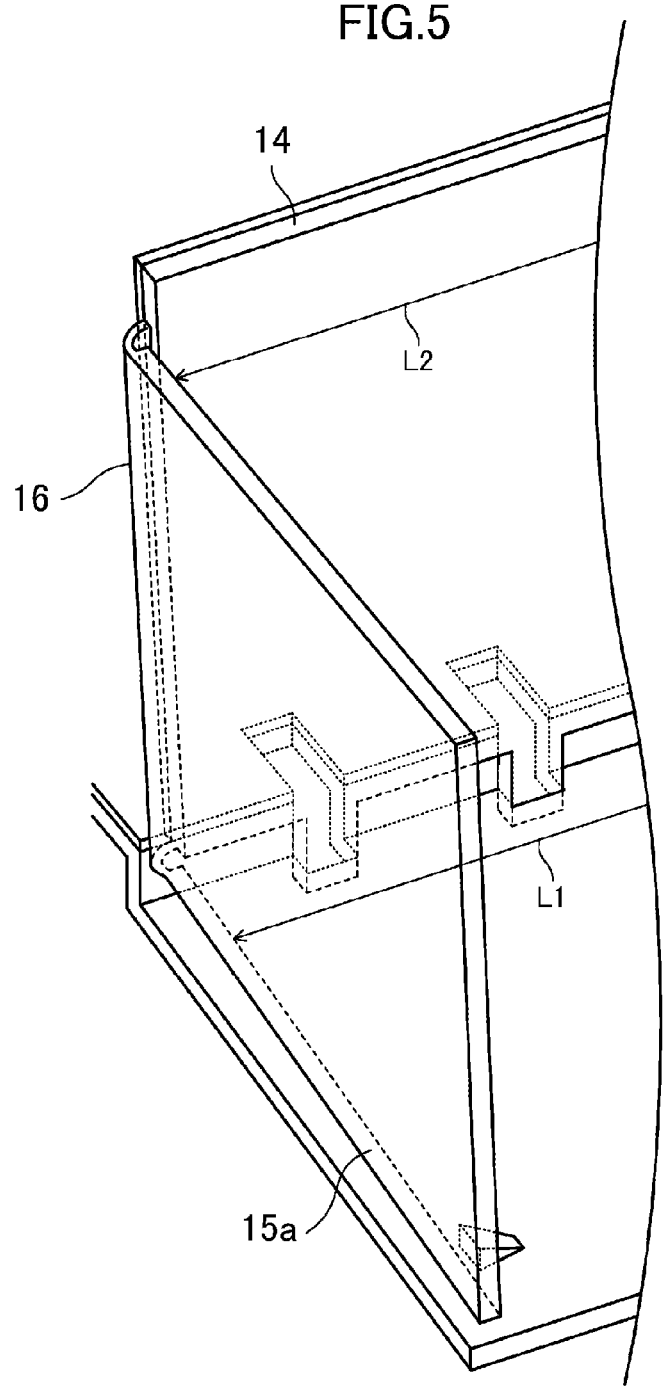
FIG. 5 is an enlarged perspective view showing a configuration in which a top panel and side panels are connected at a slant, with a lateral part cut away.
Figure 6A:
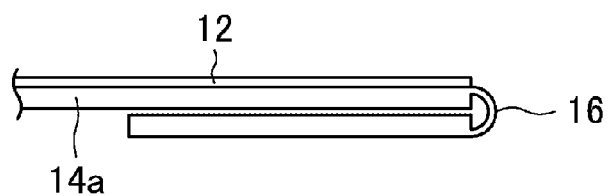
FIG. 6A is a view of the closed position from the direction of arrow VI in FIG. 4.
Figure 6B:
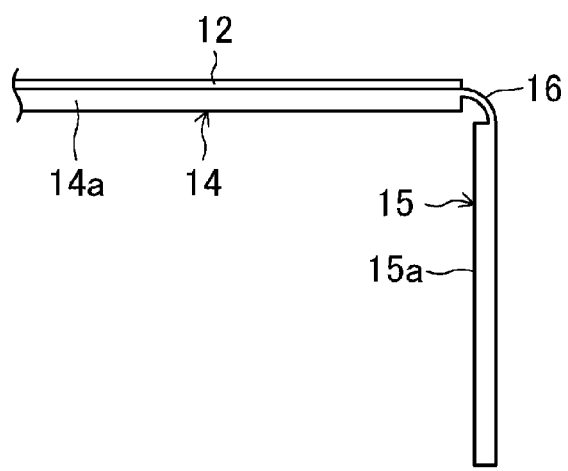
FIG. 6B is a view of the container-shaped state from the direction of arrow VI in FIG. 4.
Figure 6C:
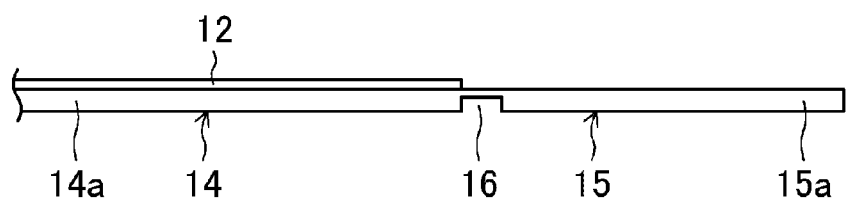
FIG. 6C is a view of the open position from the direction of arrow VI in FIG. 4.

Furthermore, as shown in FIG. 5, the pair of side panels 15 may be connected at a slant relative to the top panel 14 when raised, so that the left-right distance L2 between the upper edges of the side panels 15 is longer than the left-right distance LI between the lower edges 15a of the side panels 15. In that way, the top panel 14 becomes a trapezoid, with its upper edge longer than its lower edge. When the pair of side panels open up as the top panel is raised, it is preferable that the more the lower edges 15a of the pair of side panels 15 move backward, the more strongly they press on the housing recess 13 and their locking strength with the side-panel holding protrusions 17 is enhanced.

Next, it will be described the use procedure for the floorboard 4 having a foldable holding device 10 according to the present embodiment.

In the housed position shown in FIGS. 2, 6A, 8A and 9A, the pair of side panels 15 is located underneath the top panel 14 and is held down by the weight of the top panel 14 itself, so that a flat state is maintained. The surface of the top panel 14 is covered with the carpet material 12 so that its surface is generally at the same height as the surrounding surfaces which, in addition to presenting an attractive appearance, makes it difficult for a luggage or goods to snag when the luggage is being loaded or unloaded. In addition, by minimizing the depth of the housing recess 13, in some cases a recess will not have to be created in the floor below it. Indeed, vehicle design benefits because the thickness of the floorboard 4 can be kept as thin as possible.

Next, when the top panel 14 is to be raised as in FIG. 3, a finger is applied to the finger-hold point 14c and the panel is pulled upward. By doing that, the pair of side panels 15 connected by the hinges 16 is gradually raised. At this point, as mentioned above, if the pair of side panels 15 is connected at a slant relative to the top panel 14, as they move toward the back, they will press more strongly on the housing recess 13.

Figure 7B:
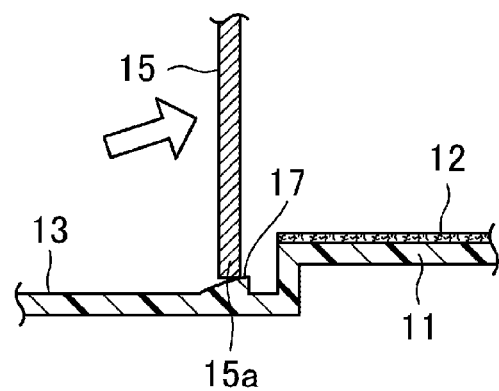
FIG. 7B is cross section view from the direction of arrow VII of FIG. 4 showing a state in which a side panel is riding up the side panel holding protrusion.

Then, from FIG. 7A to FIG. 7B, it is preferable that the hinges 16 expand automatically under the force pushing them back to their original positions. To avoid cases where raising cannot be completed, the hinges 16 may be configured as mechanical hinges including an elastic component such as a spring or rubber.

Figure 7C:
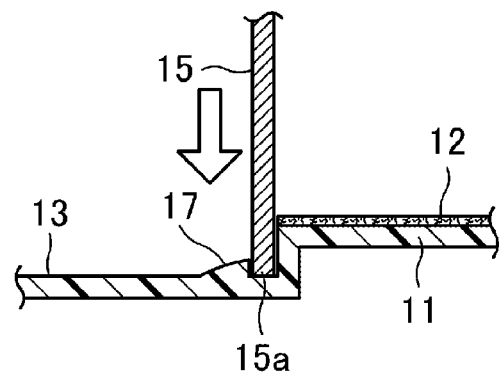
FIG. 7C is a cross section view from the direction of arrow VII of FIG. 4 showing a state in which a side panel has passed over the side panel holding protrusion.

Next, as shown in FIG. 7C, when the lower edges 15a of the side panels 15 have passed over the side-panel holding protrusions 17, the edges catch on the barb-shaped parts of the side-panel holding protrusions 17 and are pinched between these side-panel holding protrusions 17 and the side walls of the housing recess 13, and are locked.

Figure 8B:
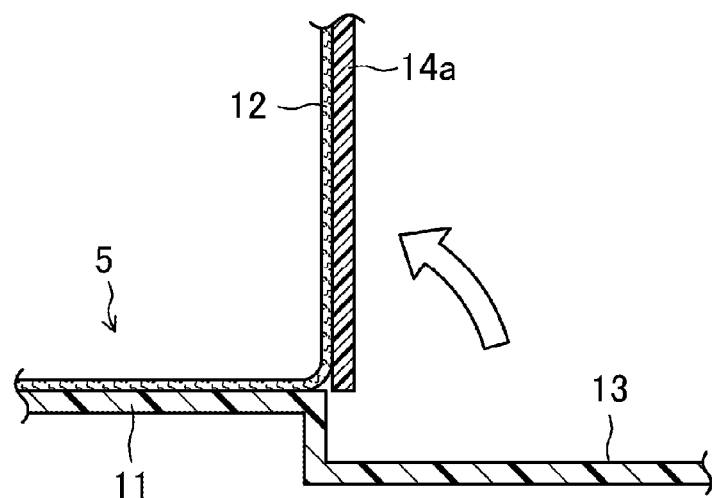
FIG. 8B is an enlarged cross section view showing the raised position along the VIII-VIII line of FIG. 4.

Likewise, as shown in FIGS. 8B and 9B, the top panel 14 is raised to 90° and the legs 14b on its lower edge fit into leg-holding points 18. In this way, the open position is maintained. If the luggage or goods housed in the holding device 10 should move forward and come into contact with the top panel 14, the legs 14b contact the side surfaces of the leg-holding points 18, so the top panel 14 is prevented from falling forward. Also, the pair of side panels 15 is made with the rigid material 14a, not the flexible material used in the past, so it is difficult to knock them over even if a force is applied to them from the housed luggage or goods. In addition, even if the weight of the luggage or goods, or the like is applied from above, it is hard to knock them over, compared to when the flexible material is used.

When closing the holding device 10, one raises the back end sides of the pair of side panels 15 with both hands so that their lower edges pass over the side-panel holding protrusions 17. After that, the pair of side panels 15 closes due to the weight of the top panel 14 itself, and it returns to the closed position.

In this way, the parts configuration of the floorboard 4 is extremely simple and can be constructed simply by attaching the carpet material to the existing rigid material and adding one part (the holding device 10) thereto.

In addition, an operation is extremely simple: it can be made so that it can be opened by a one-step operation with one hand and that open position can be maintained. Moreover, as mentioned above, it can be closed by a one-step operation of lifting the back end sides of the pair of side panels with both hands, and that closed position can be maintained.

Consequently, by means of the floorboard 4 having the foldable holding device 10 according to this embodiment, the holding device 10 can be readily raised to the container-shaped state and that container-shaped state can also be securely held.

A Variation of the First Embodiment

Figure 21:
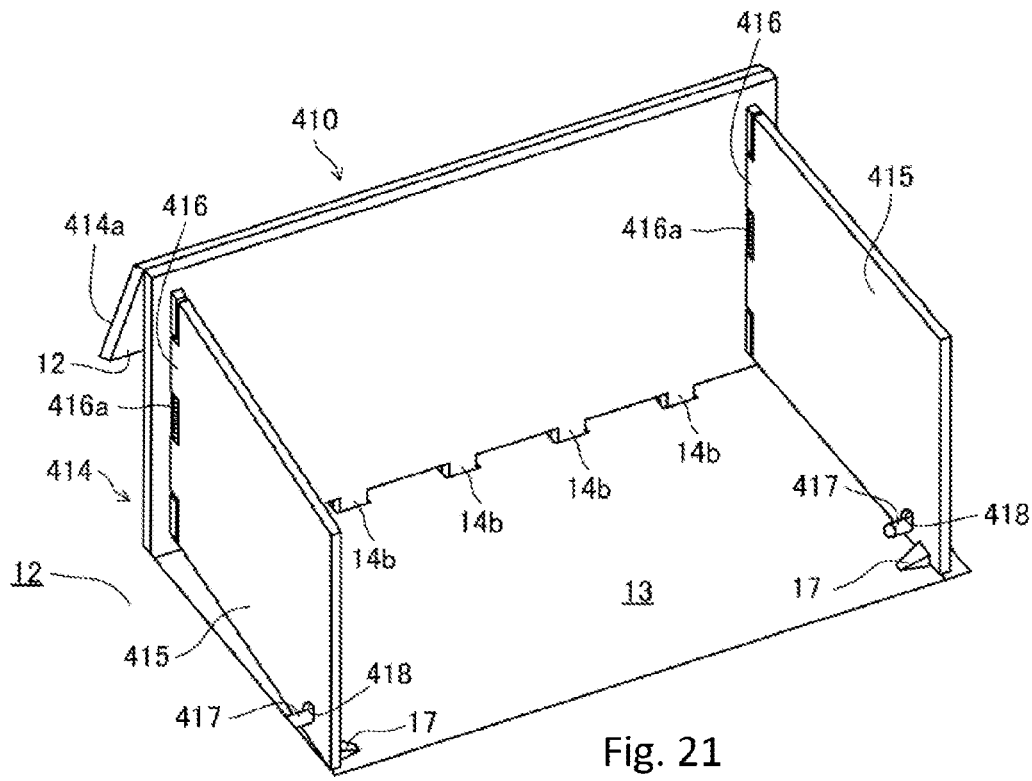
FIG. 21 is a perspective view showing a holding device in a raised state according to a variation of the first embodiment of the present invention.
Figure 22:
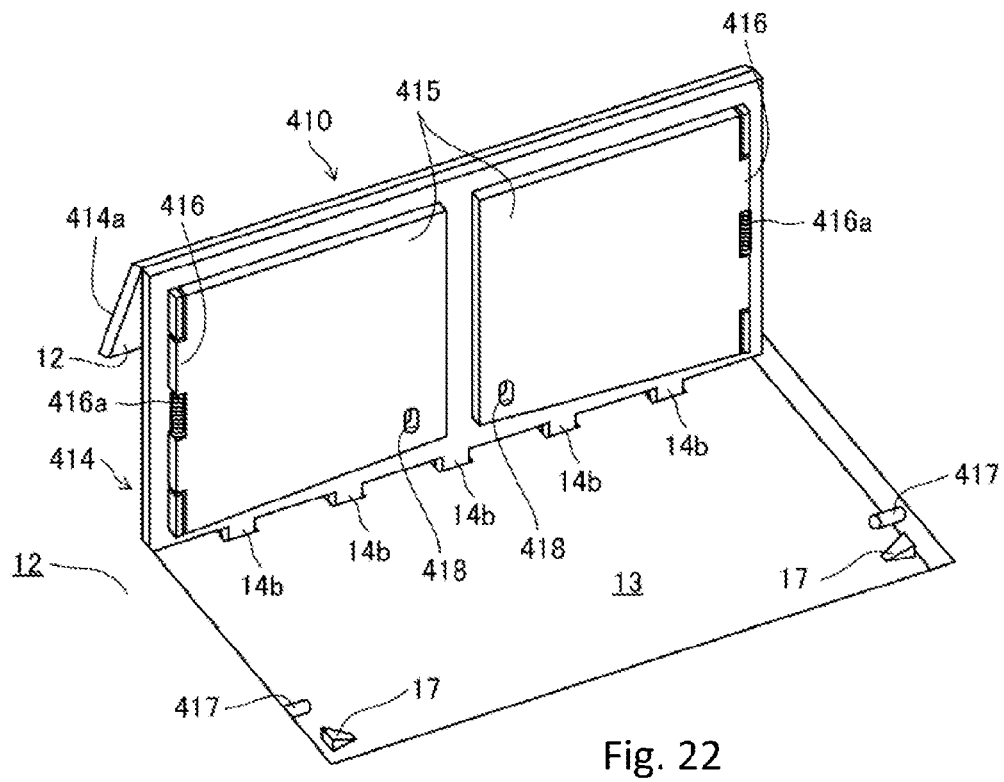
FIG. 22 is a perspective view showing a holding device in a state in which a top panel is raised and a side panel is folded according to a variation of the first embodiment of the present invention.
Figure 23:
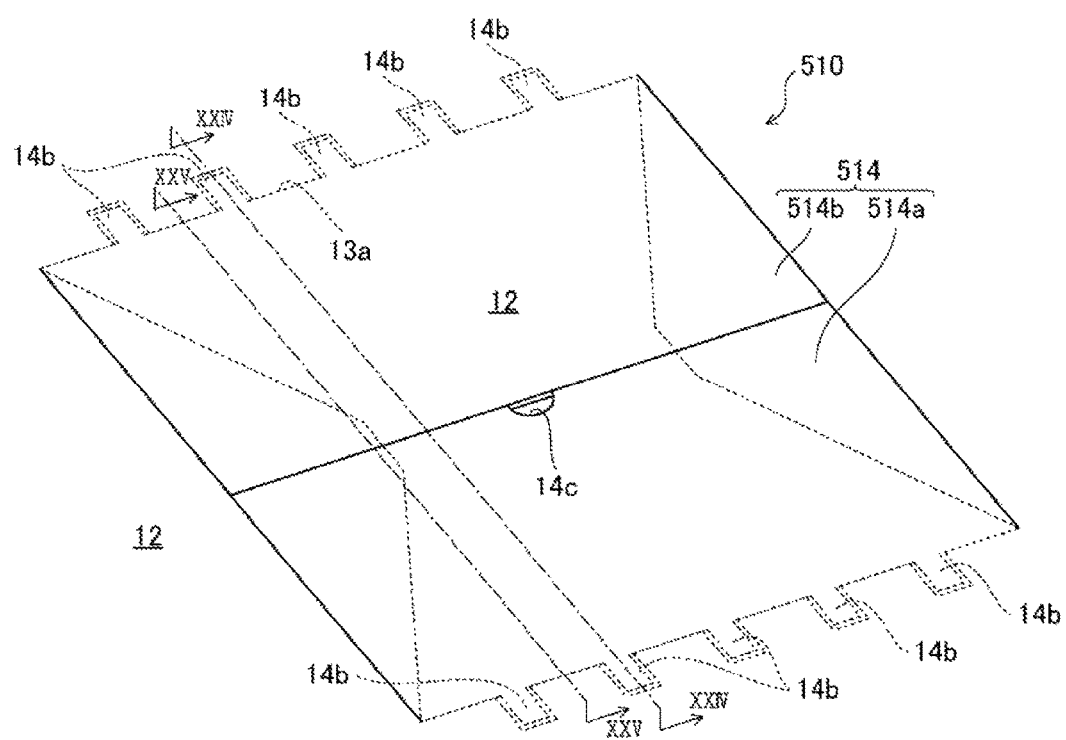
FIG. 23 is a perspective view showing a holding device according to a variation of the second embodiment of the present invention.
Figure 24:
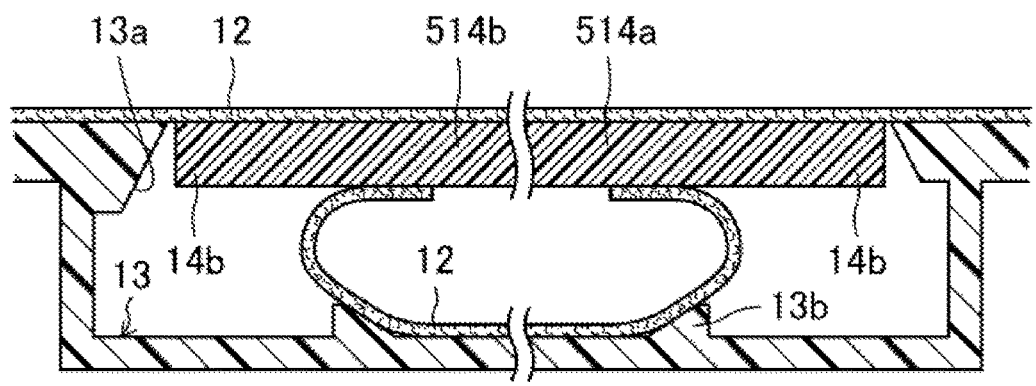
FIG. 24 is an enlarged cross section view along the XXIV-XXIV line of FIG. 23.

FIGS. 21 and 22 show a holding device 410 according to a variation of the first embodiment of the present invention. The holding device 410 employs a different raised state holding configuration as compared to the first embodiment.

In other words, the basic configuration of this embodiment is mostly the same as the first embodiment. However, in the present variation embodiment, in the top panel 414, a free end panel 414a is foldable by being connected to a main part of the top panel 414 with a carpet material 12. Further, a pair of right and left side panels 415 are connected to side edges of a back surface of the top panel 414 with hinge structures 416 so that the pair of right and left side panels 415 can open and close with respect to the top panel 414. The hinge structure 416 has a not shown support shaft. Further, an elastic component or an elastic member such as, for instance, a coil spring 416a is provided around the support shaft and is biased in a direction to open the side panel 415. Thus, when the top panel 414 is raised, the pair of right and left side panels 415 are moved outwardly to mutually opposed positions by the coil spring 416a to form, together with the top panel 414, the holding device 410 in an open state.

In the present variation embodiment, side-panel engaging members 417 substantially horizontally extend in the vicinity of the side-panel holding protrusions 17 from side walls of the housing recess 13 toward a center of the housing recess 13. Each of the side-panel engaging members 417 is configured with, for instance, a bar-shaped lock pin.

On the other hand, side-panel engaged parts 417 are formed in the pair of the side panels 415. The side-panel engaged parts 418 are engaged with the side-panel engaging members 417 in the raised state. Each of the side-panel engaged parts 418 is composed of a through hole in which the side-panel engaging member 417 is inserted. However, the side-panel engaged part 418 can also have a recessed shape into which the side-panel engaging member 417 is fitted.

Though a detailed illustration is omitted from the drawings, in a state in which the pair of the side panels 415 are opened as shown in FIG. 21, an additional holding device 410 having a similar configuration is provided in an opposed position. As a result, an even larger holding portion can be formed in the pair of the holding devices 410.

Another Variation of the First Embodiment

Figure 45:
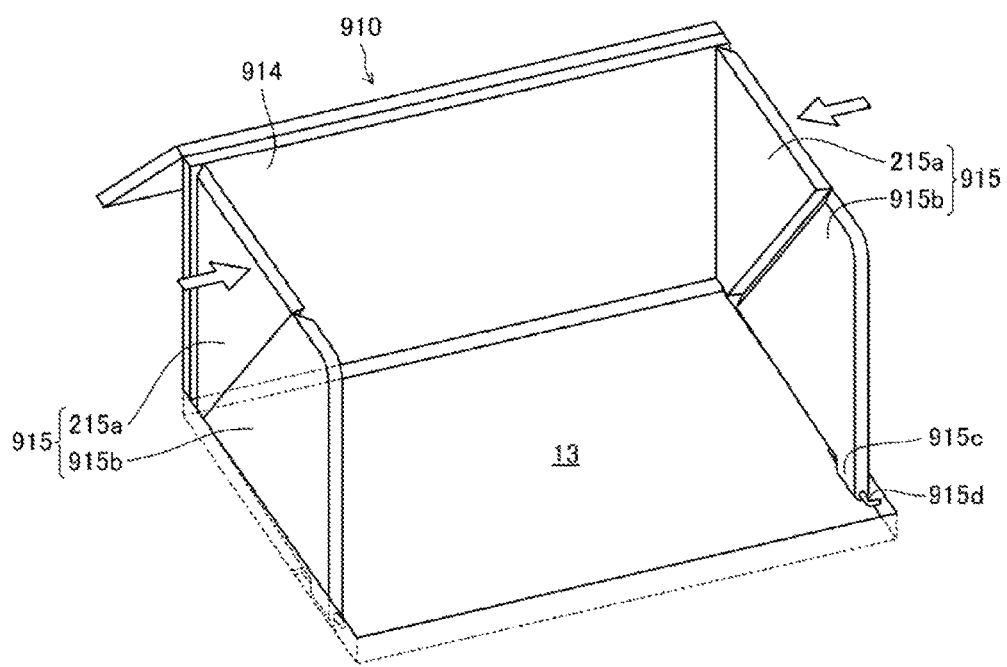
FIG. 45 is a perspective view showing a holding device in a raised state according to a variation of the first embodiment of the present invention.
Figure 46:
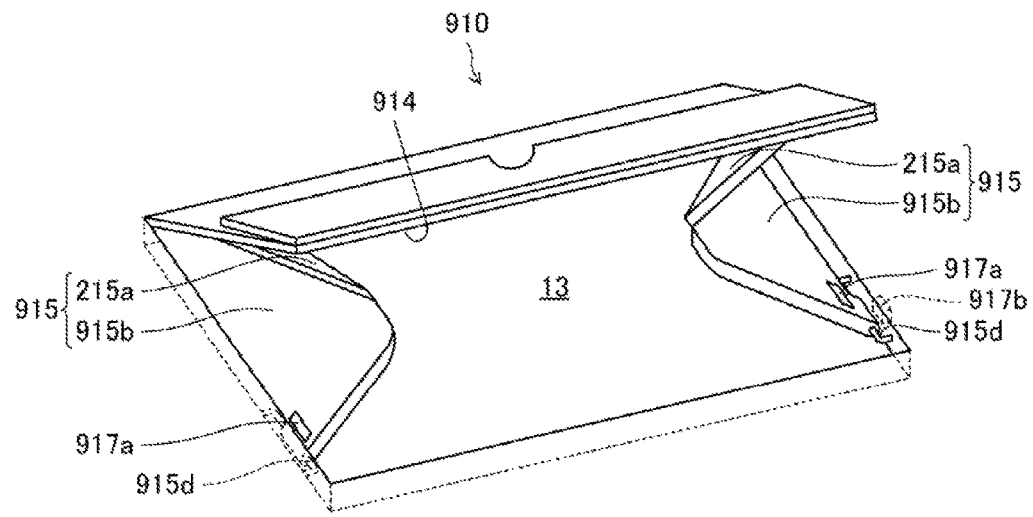
FIG. 46 is a perspective view showing in the middle of opening a holding device according to the variation of the first embodiment of the present invention.
Figure 47:
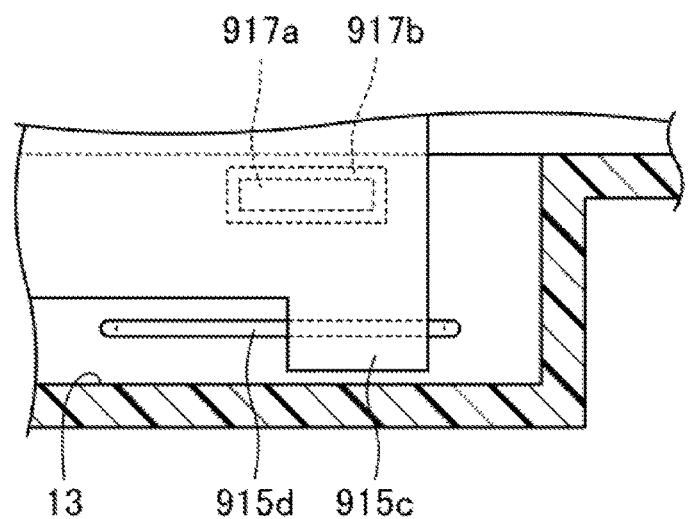
FIG. 47 is a partial enlarged cross section view showing the holding device in the raised state according to the variation of the first embodiment of the present invention.

FIGS. 45-47 show a holding device 910 according to another variation of the first embodiment of the present invention. The holding device 910 has a different raised-position holding member configuration as compared to the holding device 410 in the above variation embodiment (FIGS. 21 and 22) of the first embodiment explained above. Further, a top panel 914 is partly foldable in the same manner as the top plate 414 (the free end panel 414a is foldable by being connected to the main part of the top panel 414) in FIGS. 21-22.

Specifically, a supported part 915c projects from a second triangular side panel 915b and continuously extends from the second triangular side panel 915b. Further, a support shaft part 915d that is provided in the housing recess 13 is inserted into the supported part 915c. The support shaft part 915d is fixed to a side wall of the housing recess 13 as shown in FIGS. 45 and 46. As a result, the second triangular side panels 915b are rotatably supported around the support shaft part 915d.

In the present variation embodiment, as shown in FIG. 47, in the same manner as the other variation (FIG. 40-42) of the second embodiment explained below, a magnet 917a is embedded into or provided at one of the second triangular side panels 915b and the side wall of the housing recess 13. Further, a magnet-attractable fitting 917b is embedded into or provided at the other of the second triangular side panels 915b and the side wall of the housing recess 13. As a result, the holding power of the holding device 910 in the raised state is enhanced by using a magnetic force.

The procedures for raising and for housing are the same as the variation embodiment (FIGS. 21 and 22) of the first embodiment discussed above. As shown in FIGS. 46 and 47, because the second triangular side panel 915b rotates around the support shaft part 915d, a even more stable opening/closing operation becomes possible.

A first triangular side panel 215a and the top panel 914 are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, the first and second triangular side panels 215a and 915b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

In addition, in the present variation embodiment, side edges of the first and second triangular side panels 215a and 915b which face to each other have a unique configuration to prevent a finger from pinching between the side edges of the first and second triangular side panels 215a and 915b when the first and second triangular side panels 215a and 915b are raised. These side edges have angled planes in which the corners are taken off as shown in FIG. 45. This feature can be used in other embodiments in the present application.

Another Variation of the First Embodiment

Figure 48:
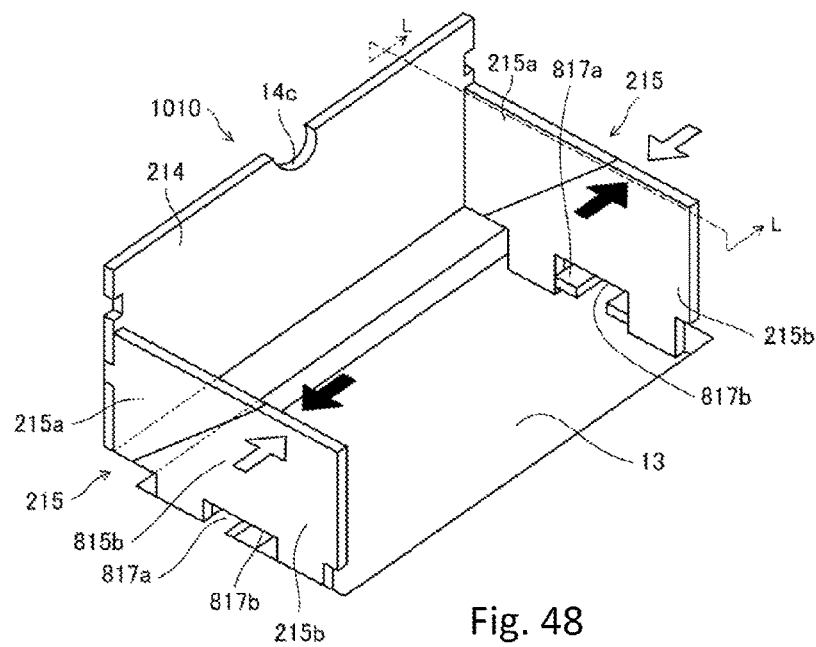
FIG. 48 is a perspective view showing a holding device in a raised state according to a variation of the second embodiment of the present invention.
Figure 49:
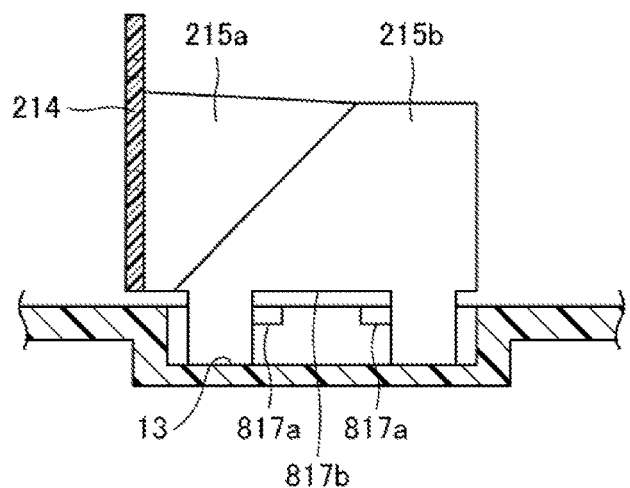
FIG. 49 is a cross section view along the L-L line of the holding device in the raised state shown in FIG. 48 according to the variation of the second embodiment of the present invention.

FIGS. 48 and 49 show a holding device 1010 according to another variation of the second embodiment of the present invention. The holding device 1010 is different from a holding device 810 of a variation (FIGS. 43 and 44) of the second embodiment explained below mainly in the configuration of the side panel.

In the present variation embodiment, in the same way as the third embodiment explained above, the holding device 1010 has one top panel 214 and a pair of side panels 215. Further, in the same manner as another variation (FIGS. 43 and 44) of the second embodiment explained below, a projection member (a leg-holding member) 817a and a cut part 817b are provided. The projection member 817a substantially horizontally projects from a side wall of the housing recess 13. The cut part 817b is formed in a leg that extends downward relative to the second triangular side panel 517b and is fitted into the projection member 817a in the raised position.

Also in the present variation embodiment, a raised-position holding member is configured with the projection member 817a and the cut part 817b that is fitted into the projection member 817a in the raised position.

Each side panel 215 is configured with two triangular side panels 215a and 815b as shown in FIG. 48. First triangular side panels 215a and the top panel 214 are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, the first and second triangular side panels 215a and 815b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Another Variation of First Embodiment

Figure 51:
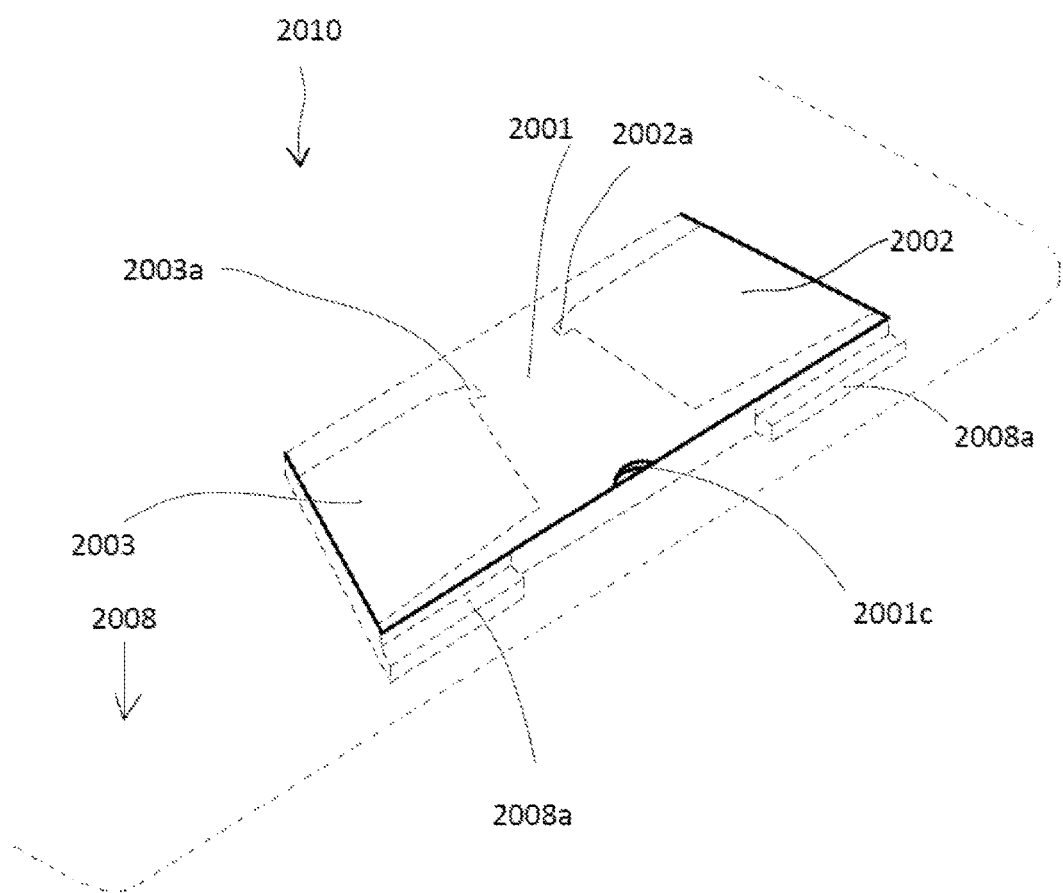
FIG. 51 is a perspective view showing a holding device in a housed state according to a variation of the first embodiment of the present invention.
Figure 52:
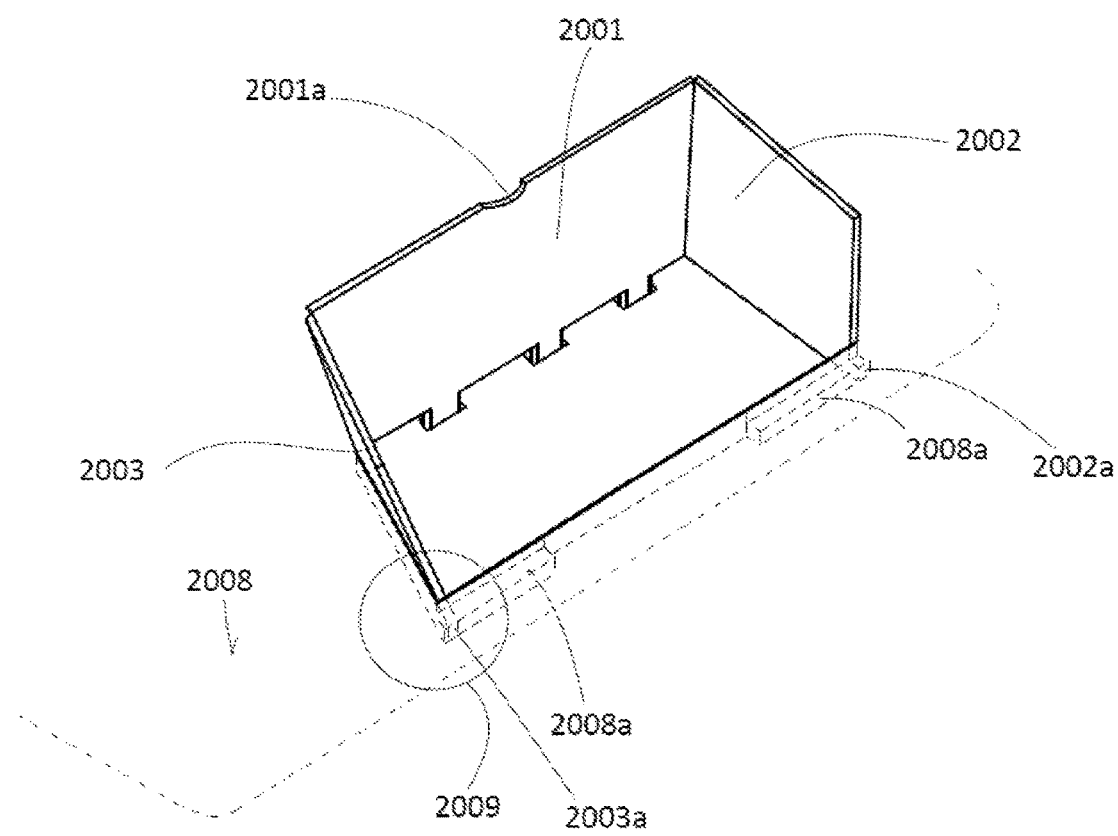
FIG. 52 is a perspective view showing the holding device in the raised state according to the variation of the first embodiment of the present invention.
Figure 53:
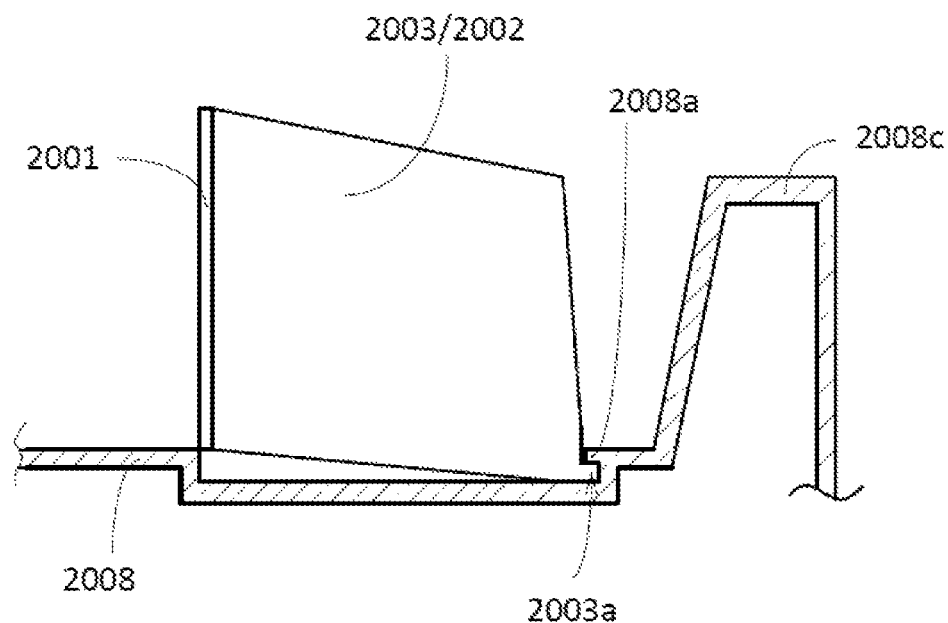
FIG. 53 is a partly cross section view showing a side panel of the holding device in the raised state shown in FIG. 52 according to the variation of the first embodiment of the present invention.
Figure 54:
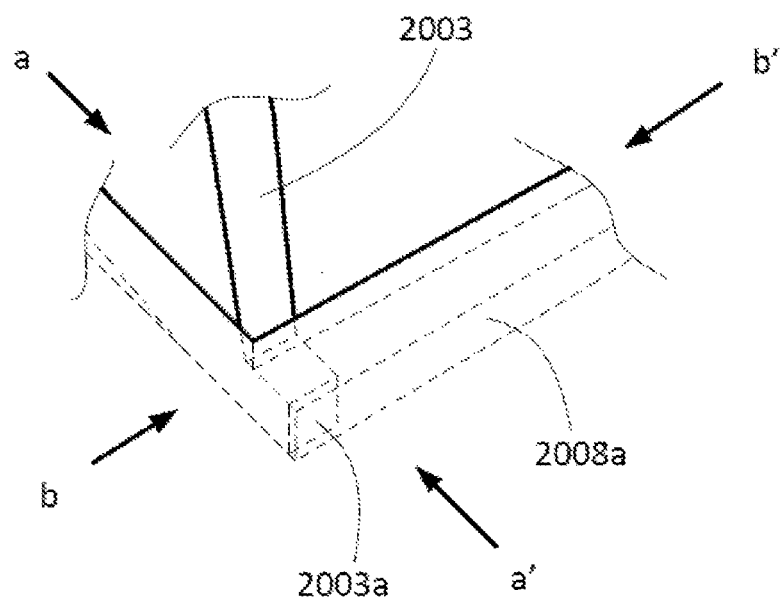
FIG. 54 is a partial enlarged perspective view showing the side panel of the holding device in the raised state shown in FIG. 52 according to the variation of the first embodiment of the present invention.

FIGS. 51-57 show another variation of the first embodiment. A foldable holding device 2010 is mounted on or built in a luggage compartment or a trunk of an automobile as shown in FIG. 51. Because side panels 2002 and 2003 are embedded in a housing recess formed in a floorboard 2008, a top panel 2001 with a finger-holding point 2001c can be seen in a stored or housed state of the holding device 2010. The carpet material 12 and the several legs 14b shown in the other drawings are omitted because a feature of this embodiment is a configuration of the side panels 2002 and 2003. Specifically, there are side panel projections 2002a and 2003a at a bottom side of the side panels 2002 and 2003. These side panel projections 2002a and 2003a are slidably inserted in floorboard slots 2008a when the holding device 2010 is raised as shown in FIGS. 52-54 and 55A-55B.

As discussed in the above first embodiment and its variations and a second embodiment and its variations discussed below, the top panel 2001 and sides of the side panels 2002 and 2003 are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 below.

Figure 57:
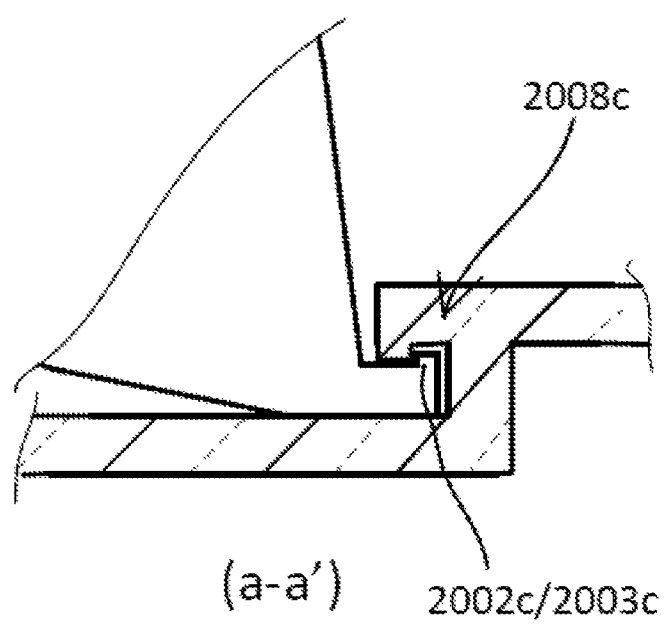
FIG. 57 is a partial cross section view showing that the side panel is fixed by engaging an L-shaped engagement projection of the side panel of the holding device in the raised state with a floorboard slot (a receiving channel) of a housing.

A configuration of the side panel projections 2002a and 2003a and the floorboard slots 2008a may be in a different shape. As shown in FIGS. 56A-56B, a bottom surface of the housing recess of the floorboard 2008 has another concave to lock the side panel projections 2002a and 2003a when the holding device 2010 in a raised state (see FIG. 56B). Further, a top wall 2008c of the floorboard 2008 has a concave to secure tips 2002c and 2003c of the side panel projections 2002a and 2003a as shown in FIG. 57. However, if the side panels 2002 and 2003 are not fully opened and raised in the raised state by the coil spring (not shown), a hand assist is required for pushing the side panels outwardly to properly secure the side panel projections 2002a and 2003a to the floorboard slots 2008a. Therefore, the side panels 2002 and 2003 are securely fixed to the floorboard 2008 in the raised state.

Second Embodiment

FIGS. 10 through 15 show a holding device 110 according to a second embodiment of the present invention, which differs from the first embodiment discussed above in that its form is different. That said, in each of the following embodiments, for components that are the same as in FIG. 1 through FIG. 9, the same reference numbers are assigned, but a detailed description of each is omitted.

Figure 11:
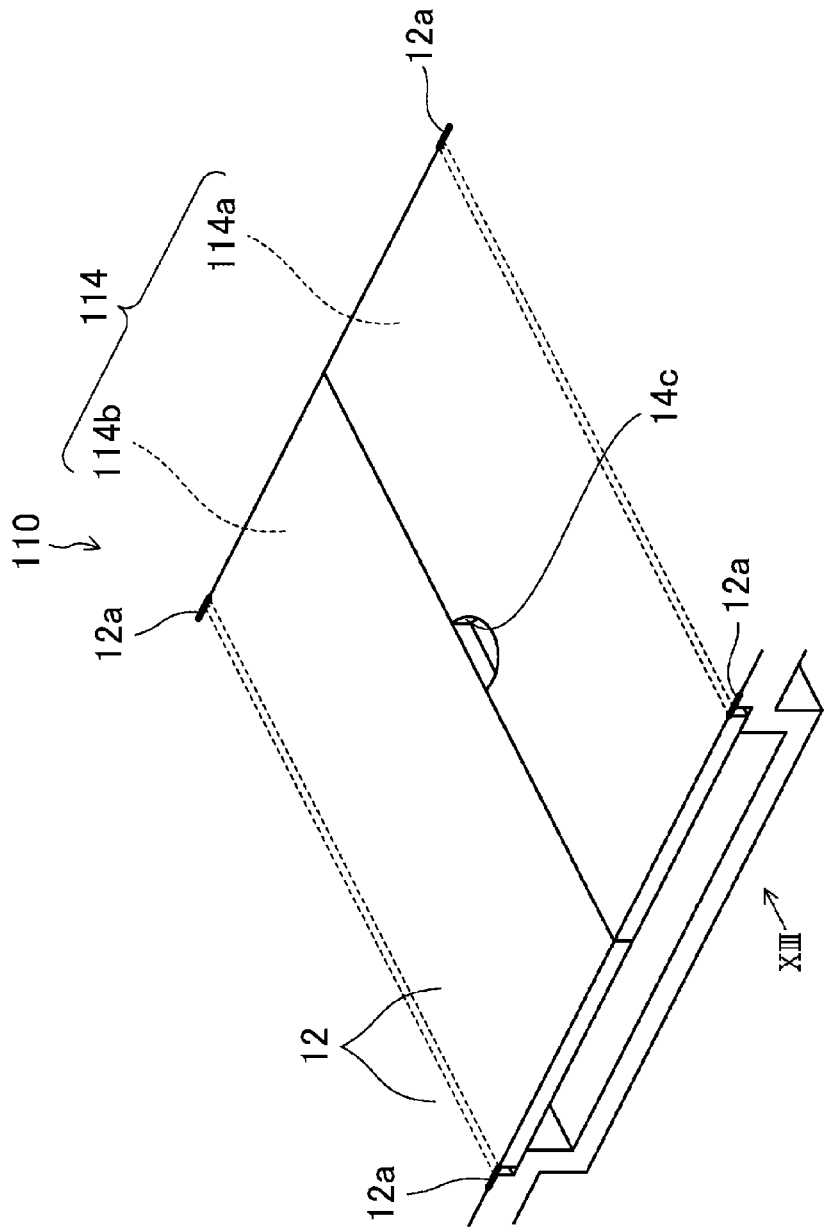
FIG. 11 is a perspective view showing the holding device in the housed position, with a lateral part cut away.

In this embodiment, a top panel 114 has a raisable first top panel 114a and a raisable second top panel 114b, each of which is supported so that it can swing centered on one of the pair of opposing edges (corresponding to the front and back edges of the housing recess 13). The first top panel 114a and the second top panel 114b form the flat top panel 114 when the holding device 110 is in a folded position. The surface of the top panel 114 is covered with the same carpet material as the surrounding area, so it presents an attractive appearance. As shown in FIG. 11, if the carpet material 12 is provided with slits 12a, opening and closing of the top panel 114 can be done smoothly.

The pair of side panels 115 is foldably connected to both ends of the first top panel 114a and the second top panel 114b. The pair of side panels 115 is formed of a lightweight sheet-like material with comparatively high stiffness such as a molded resin component or the like of thickness of roughly 12 mm, for example. When the first top panel 114a and the second top panel 114b are raised, they are raised into mutually opposing positions and together with top panel 114 form the holding device 110 in the shape of a rectangular parallelepiped.

The side panels 115 are each made of a pair of first triangular side panels 115a, each roughly triangular shaped, and foldably attached to an edge of the first top panel 114a and the second top panel 114 b, and a second triangular side panel 115b. In the present embodiment each first triangular side panel 115a is formed of a flat panel of a roughly right-triangle shape. As shown in the figure, this includes a corner being cut off to form a trapezoidal shape. To each sloped edge of the pair of first triangular side panels 115a, the second triangular side panel 115b is foldably connected. The second triangular side panel 115b has, for example, an almost isosceles triangle with its tip flattened. It is configured so that in the raised position its lower edge becomes a lower edge of the side panel 115. In addition, the pair of first triangular side panels 115a, the second triangular side panels 115b, and the pair of top panels 114 are foldably connected to each other by flexible fabric components 112. There is no particular limitation upon the fabric components, but they are made of a flexible and durable sheet plastic, etc. and at least the left and right outer side surfaces of the areas where they are mutually connected should be covered. Also, for example, the entire left and right outer-side side surfaces and the areas where they are connected to the first top panel 114a and the second top panel 114b may be covered. Furthermore, as shown in FIG. 13 and FIG. 14, the areas where the first top panel 114a and the second top panel 114b are connected to the side walls of the housing recess 13 are also connected by a supplemental fabric material 112b on the side opposite to the carpet material 12.

At the surfaces where the first triangular side panels 115a and the second triangular side panel 115b mate, raised-position support components 117 are provided. These raised-position support components 117 have, for example, a magnet 117a and a magnet-attractable fitting 117b which is made of a metal such as iron that is attracted to the magnet. The magnet-attractable fitting 117b may be constructed of a magnet or an assembly of magnets and metal components. The magnet 117a and the magnet-attractable fitting 117b may be insert-molded into the respective mating surfaces of the first triangular side panels 115a and the second triangular side panel 115b leaving them exposed, or they may be fitted into recesses formed in the mating surfaces. Moreover, these raised-position support components 117 may also be positioned at the mating surfaces of the first triangular side panels 115a and the first top panel 114a and/or the second top panel 114b.

Next, it will be described the use procedure for the floorboard 4 having the foldable holding device 110 according to the present embodiment.

Figure 13:
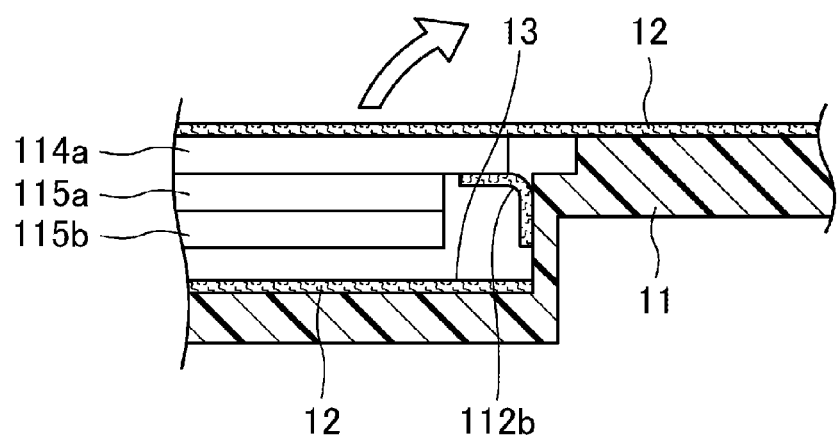
FIG. 13 is an enlarged detail view from the direction of arrow XIII in FIG. 11.
Figure 14:
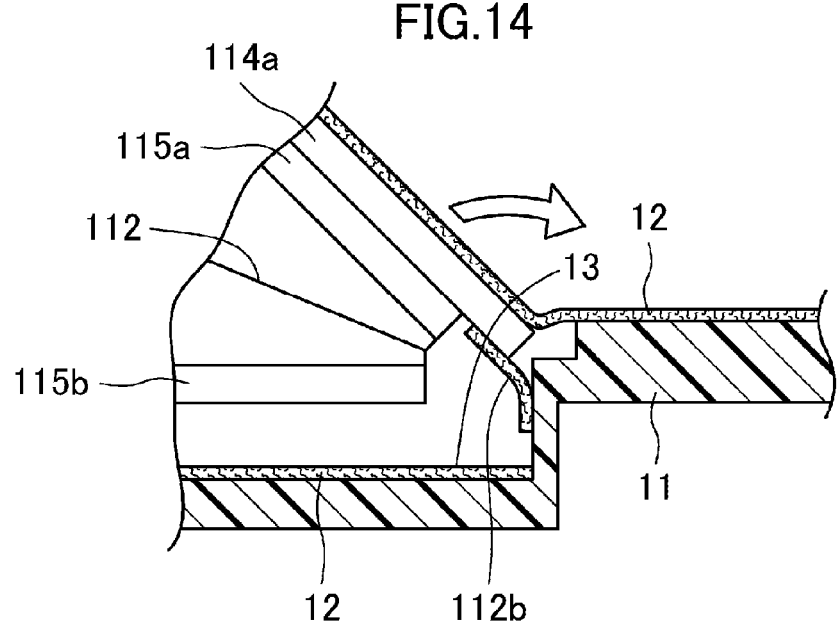
FIG. 14 is a view that corresponds to FIG. 13 for the partly raised state.
Figure 15:
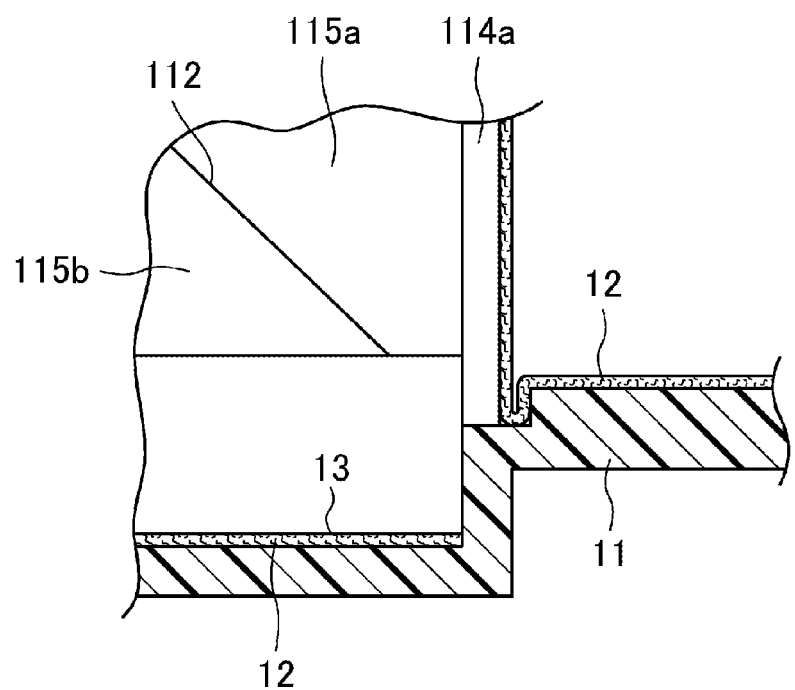
FIG. 15 is a view that corresponds to FIG. 13 for the raised position.

In the housed position shown in FIG. 11, the pair of side panels 115 is under the top panel 114 as shown in FIG. 13 and is held down by the weight of the top panel 114 so that a flat state is maintained. The surface of the top panel 114 is covered with the carpet material 12 so that its surface is generally at the same height as the surrounding surfaces which, in addition to presenting an attractive appearance, makes it difficult for luggage or goods to snag when the luggage or goods is being loaded or unloaded. In the present embodiment also, by minimizing the depth of the housing recess 13, in some cases a recess will not have to be created in the floor below it. Indeed, vehicle design benefits because the thickness of the floorboard 4 can be kept as thin as possible.

Figure 12:
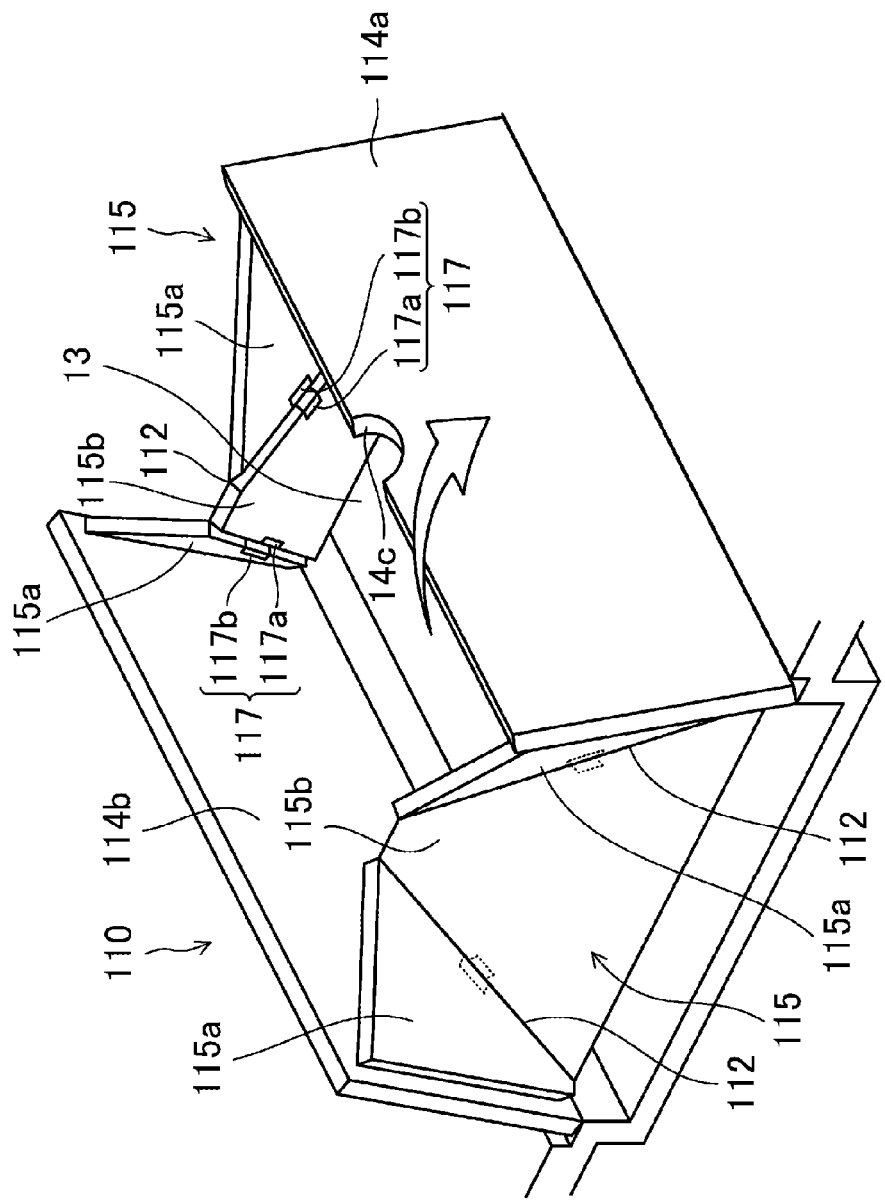
FIG. 12 is a perspective view showing the holding device being partially raised, with a lateral part cut away.

Next, when the top panel 114 is to be raised as in FIG. 12, a finger is applied to the finger-hold point 14c and the panel is pulled upward. By doing that, as shown in FIG. 14, the first triangular side panels 115a which are connected to the first top panel 114a by means of fabric components 112 are pulled up and as a result, the second top panel 114b on the opposite side is also gradually raised.

It is preferable that by pulling up the first top panel 114a, the second top panel 114b on the opposite side is also completely raised, but if it cannot be fully raised, one may grip the second top panel 114b in one's hand and pull it up.

When this is done, as shown in FIG. 12, the magnet 117a and the magnet-attractable fitting 117b are pulled together by a magnetic force, and almost automatically, by means of the magnetic force, each side panel 115 rises to become one flat panel. This position is maintained by the magnetic force.

In this way, upon opening the device by pulling up the first top panel 114a, the pair of side panels 115 connected to it and the second top panel 114b also open and, working together, form a holding device in the form of a rectangular parallelepiped. Each side panel 115 is formed of three foldable triangles and, when raised, the raised position is maintained by the raised-position support components 117. As a result, the holding device 110 readily becomes container shaped and that container-shaped state is maintained.

In reverse, when closing, one simultaneously pushes the pair of side panels 115 downward and inward. On the other hand, it is made so that even if an unintended force is applied to only one of the side panels 115, it will not close.

Consequently, with the floorboard 4 having the foldable holding device 110 according to this embodiment also, the holding device 110 can be readily raised to the container-shaped state and that container-shaped state can also be securely held.

A Variation of the Second Embodiment

FIGS. 23-28 show a holding device 510 according to a variation of the second embodiment of the present invention. The holding device 510 is different from the second embodiment explained above mainly in the configuration of the legs 14b.

Specifically, in the present variation embodiment, another feature is added to an area directly adjacent to the legs 14b. In a top panel 514 according to the present variation embodiment, the legs 14b are provided to both of a pair of top panels 514a and 514b. It is possible to provide the legs 14b with each of the top panels in the same manner as the present embodiment as this variation embodiment. Alternatively, when there are other configurations for holding the raised state, the legs 14b do not need to be provided to any of the top panels.

Further, a carpet material 12 can also be provided to a bottom surface of the housing recess 13. The carpet material 12 may also be adhered to a back (an inner) side of the first top panel 514a and the second top panel 514b.

Figure 25:
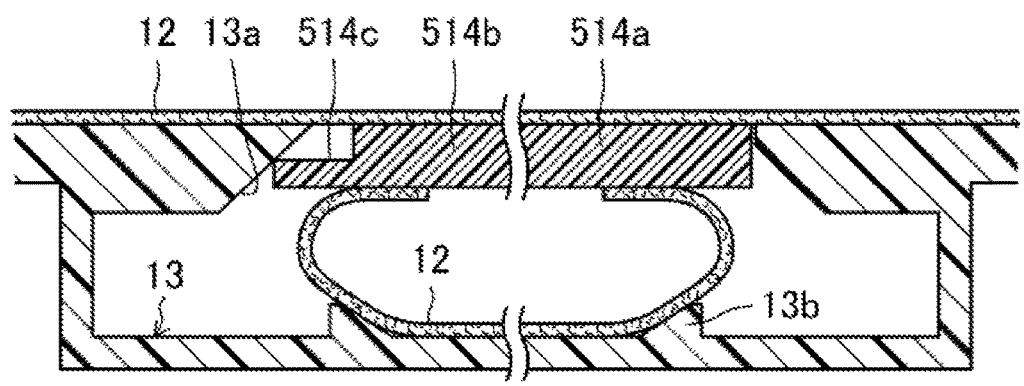
FIG. 25 is an enlarged cross section view along the XXV-XXV line of FIG. 23.
Figure 26:
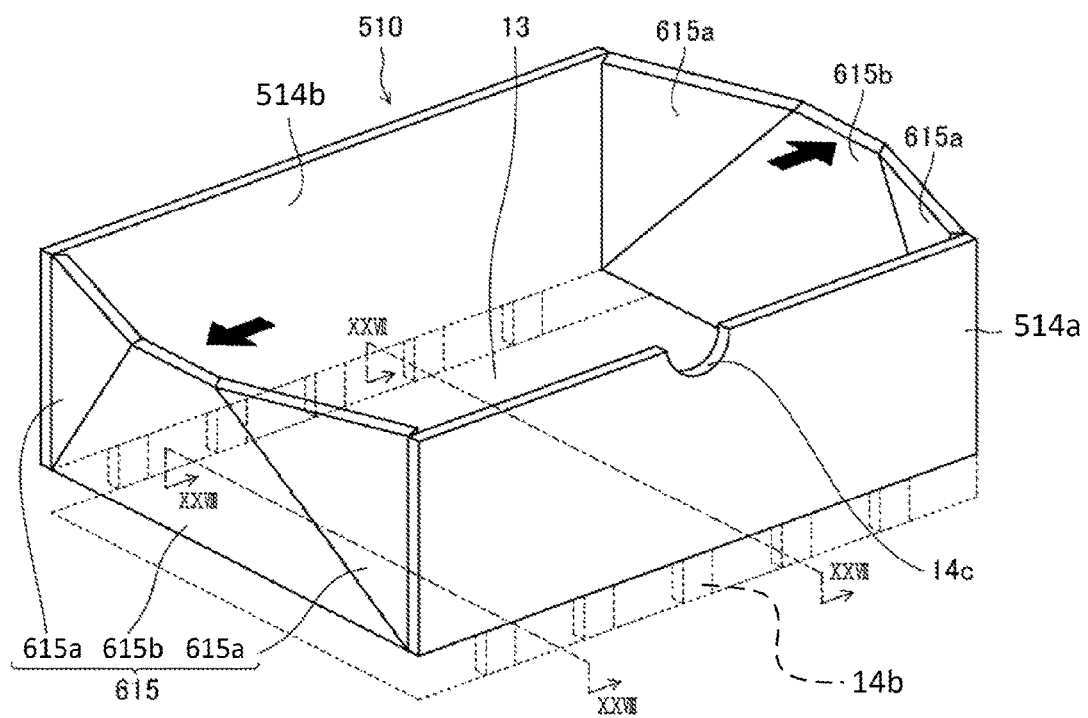
FIG. 26 is a perspective view showing a holding device in a raised state according to a variation of the second embodiment of the present invention.
Figure 27:
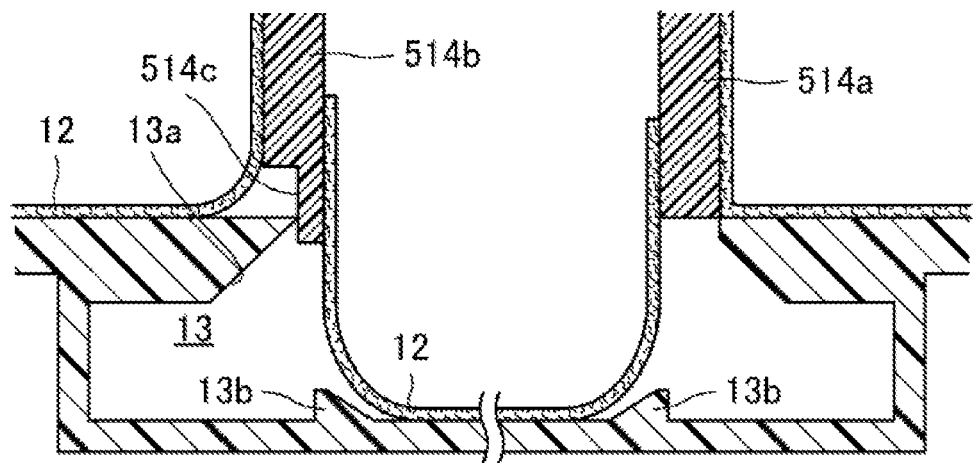
FIG. 27 is an enlarged cross section view along the XXVII-XXVII line of FIG. 23.

As shown in FIGS. 25 and 27, a recess 514c for preventing interference is formed on a base end side (a lower edge) of the second top panel 514b. By providing this recess 514c, as shown in FIGS. 26-28, the contact of the recess 514c with a side surface 13a of the housing recess 13 can become smooth when the states of the holding device 510 are switched between the housed state and the raised state.

Figure 28:
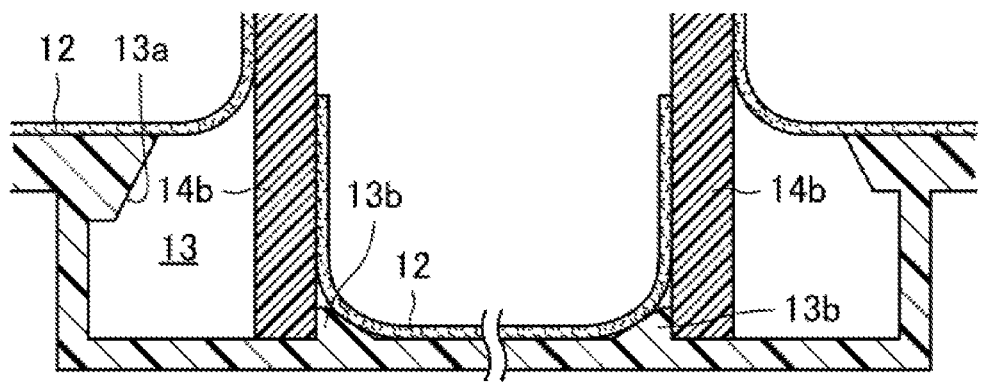
FIG. 28 is an enlarged cross section view along the XXVIII-XXVIII line of FIG. 23.

Further, as shown in FIG. 28, stoppers 13b that are provided on the bottom surface of the housing recess 13 can easily hold the raised state of the holding device 510 by contacting the tips of the legs 14b in the raised state.

Each side panel 615 is configured with three triangular side panels 615a and 615b as shown in FIG. 26. First triangular side panels 615a and the top panels 514a and 514b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, the first and second triangular side panels 615a and 615b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Another Variation of the Second Embodiment

Figure 40:
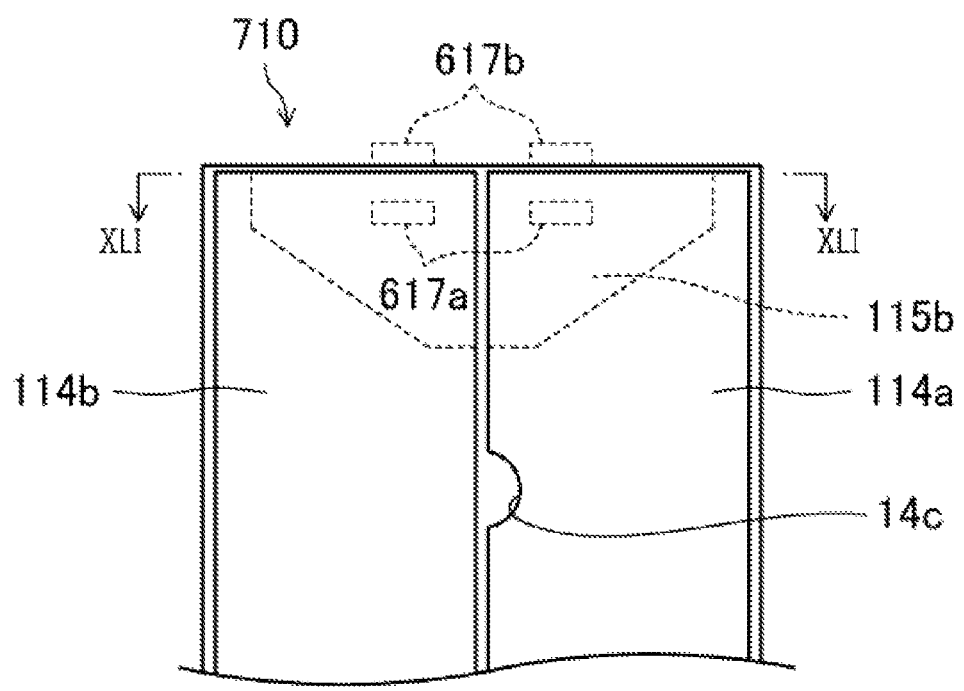
FIG. 40 is a partial enlarged plan view showing a part of a holding device in a housed state according to the variation of the second embodiment of the present invention.
Figure 41:
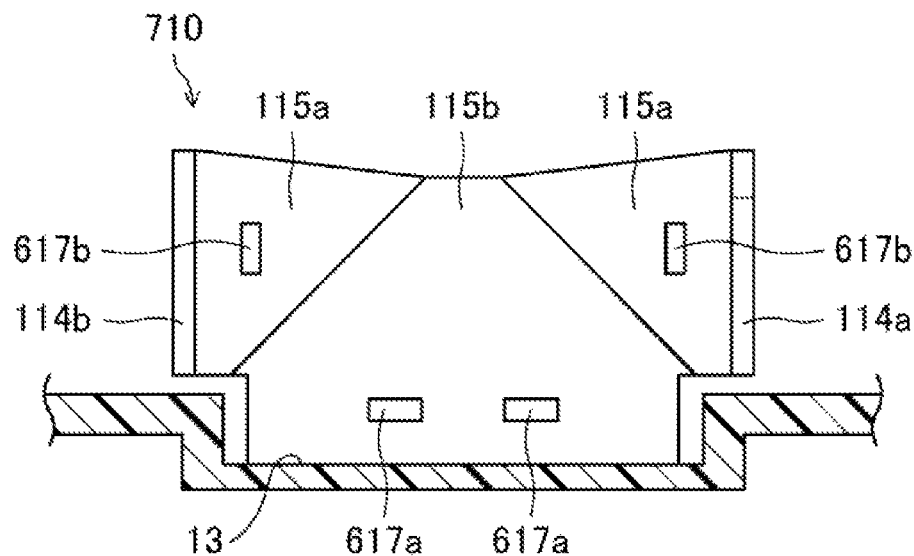
FIG. 41 is a partial enlarged cross section view along the XLI-XLI line of FIG. 40 showing a part of the holding device in a raised state according to the variation of the second embodiment of the present invention.
Figure 42:
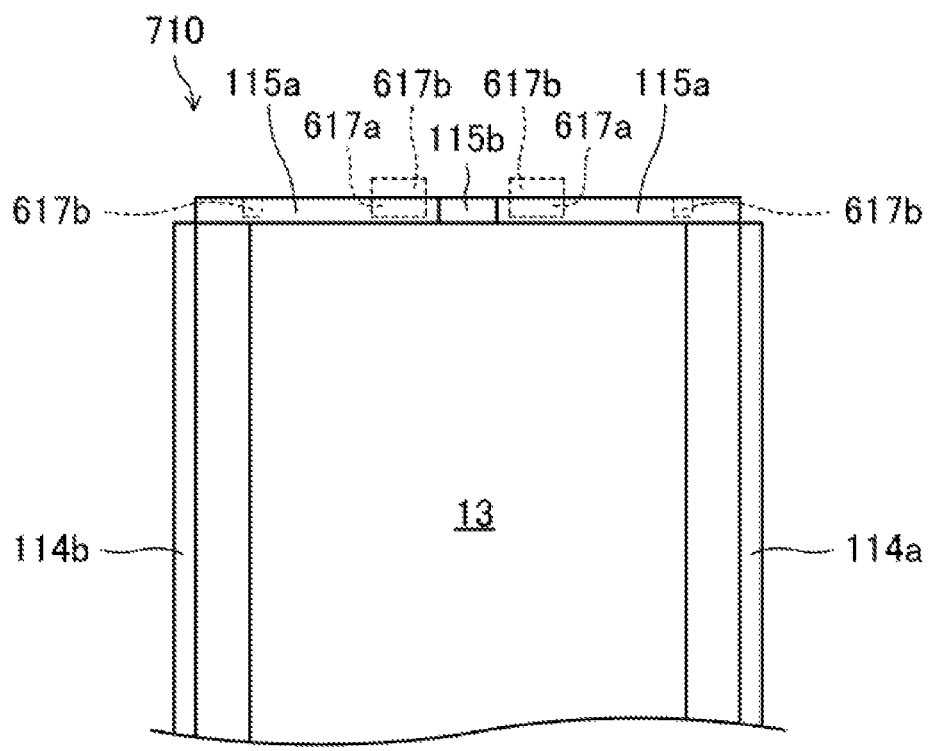
FIG. 42 is a partial enlarged plan view showing a part of the holding device in the raised state according to the variation of the second embodiment of the present invention shown in FIG. 40.

FIGS. 40-42 show a holding device 710 according to another variation of the second embodiment of the present invention. The holding device 710 is different from the second embodiment explained above mainly in the configuration of the raised-position holding member.

Specifically, as shown in FIG. 41, a pair of magnets 617a are embedded into or provided at a second triangular side panel 115b. Also, magnet-attractable fittings 617b are embedded into or provided at predetermined positions of first triangular side panels 115a, respectively, as shown in FIGS. 40 and 41. The predetermined positions correspond to the position of the magnets 617a when the first triangular side panels 115a and the second triangular side panel 115b are folded to be housed in the housing recess 13. In other words, the magnets 617a of the second triangular side panel 115b and the magnet-attractable fittings 617b of the first triangular side panels 115a respectively overlap with each other in the housed state in a plan view. The magnets 617a and the magnet-attractable fittings 617b can also be respectively provided at the opposite positions in the first triangular side panels 115a and the second triangular side panel 115b. In the same manner as shown in FIGS. 40 and 42, additional magnet-attractable fittings 617b are embedded into or provided at side walls of the housing recess 13 at the position corresponding to the pair of the magnets 617a of the second triangular side panel 115b when the holding device 710 is in the raised state.

By implementing the configurations explained above, in the housed state shown in FIG. 40, an unstableness of the first triangular side panels 115a and the second triangular side panel 115b is prevented by the fixation of the magnets 617a. Further, in the raised state shown in FIGS. 41 and 42, the raised state of the first triangular side panels 115a and the second triangular side panel 115b, and ultimately the holding device 710, is stably maintained.

The procedures for raising and for housing are the same as the second embodiment. However, the raised state and the housed state of the holding device 710 become further stabilized by using the magnets and the magnet-attractable fittings in the present variation embodiment.

Each side panel is configured with three triangular side panels 115a and 115b as shown in FIG. 41. First triangular side panels 115a and the top panels 114a and 114b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, the first and second triangular side panels 115a and 115b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Another Variation of the Second Embodiment

Figure 43:
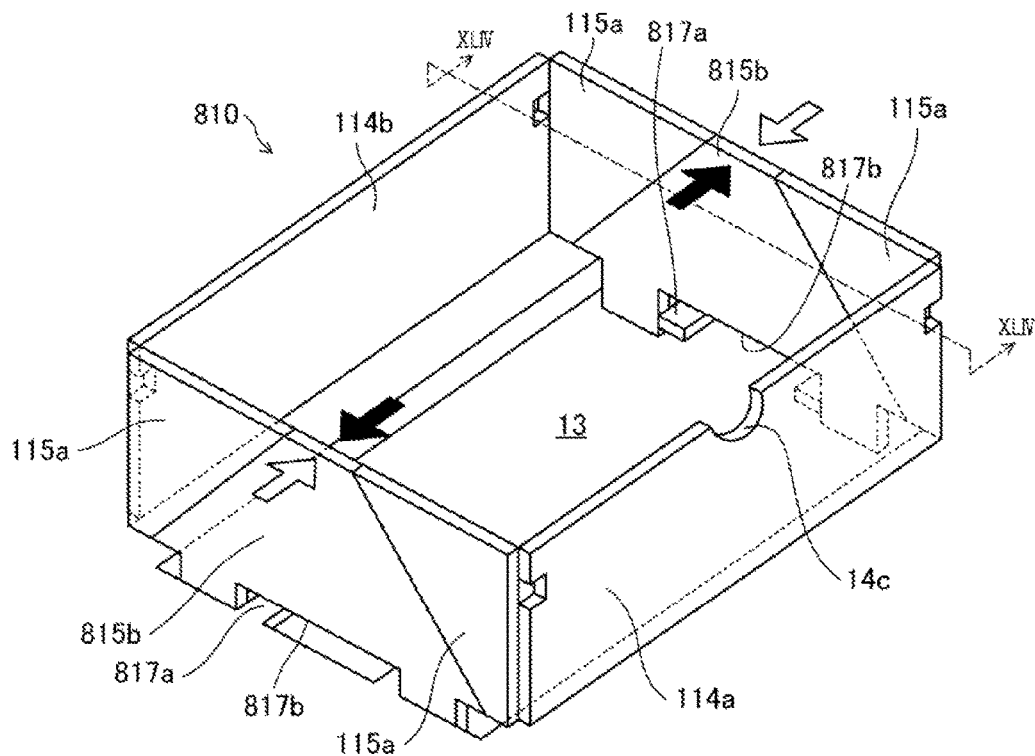
FIG. 43 is a perspective view showing a holding device in a raised state according to a variation of the second embodiment of the present invention.
Figure 44:
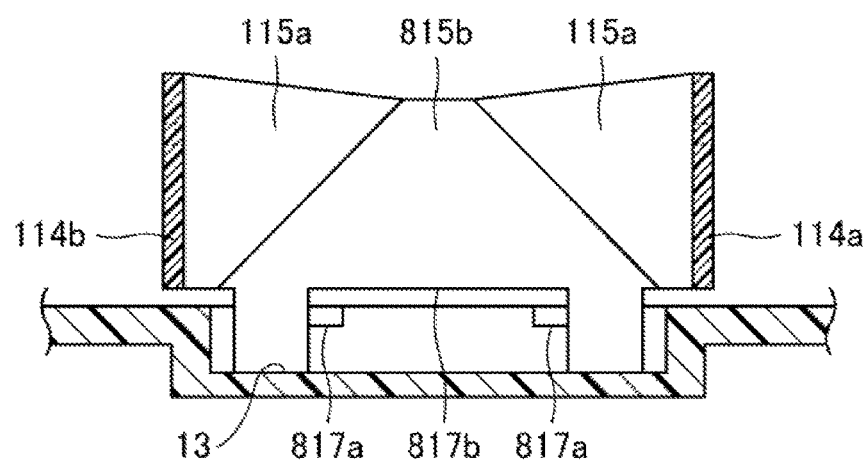
FIG. 44 is an enlarged cross section view along the XLIV-XLIV line of FIG. 43 according to the variation of the second embodiment of the present invention.

FIGS. 43 and 44 show a holding device 810 according to another variation of the second embodiment of the present invention. The holding device 810 is different from the second embodiment explained above mainly in the configuration of the raised-position holding member.

Specifically, the raised-position holding member is configured with a projection member (a leg-holding member) 817a and a cut part 817b. The projection member 817a substantially horizontally projects from a side wall of the housing recess 13. The cut part 817b is formed in a leg that extends downward relative to a second triangular side panel 815b and is fitted into the projection member 817a in the raised position. In the present variation embodiment, by implementing this holding structure, the side panels 115a and 815b are stably maintained, particularly in the raised state.

Figure 19:
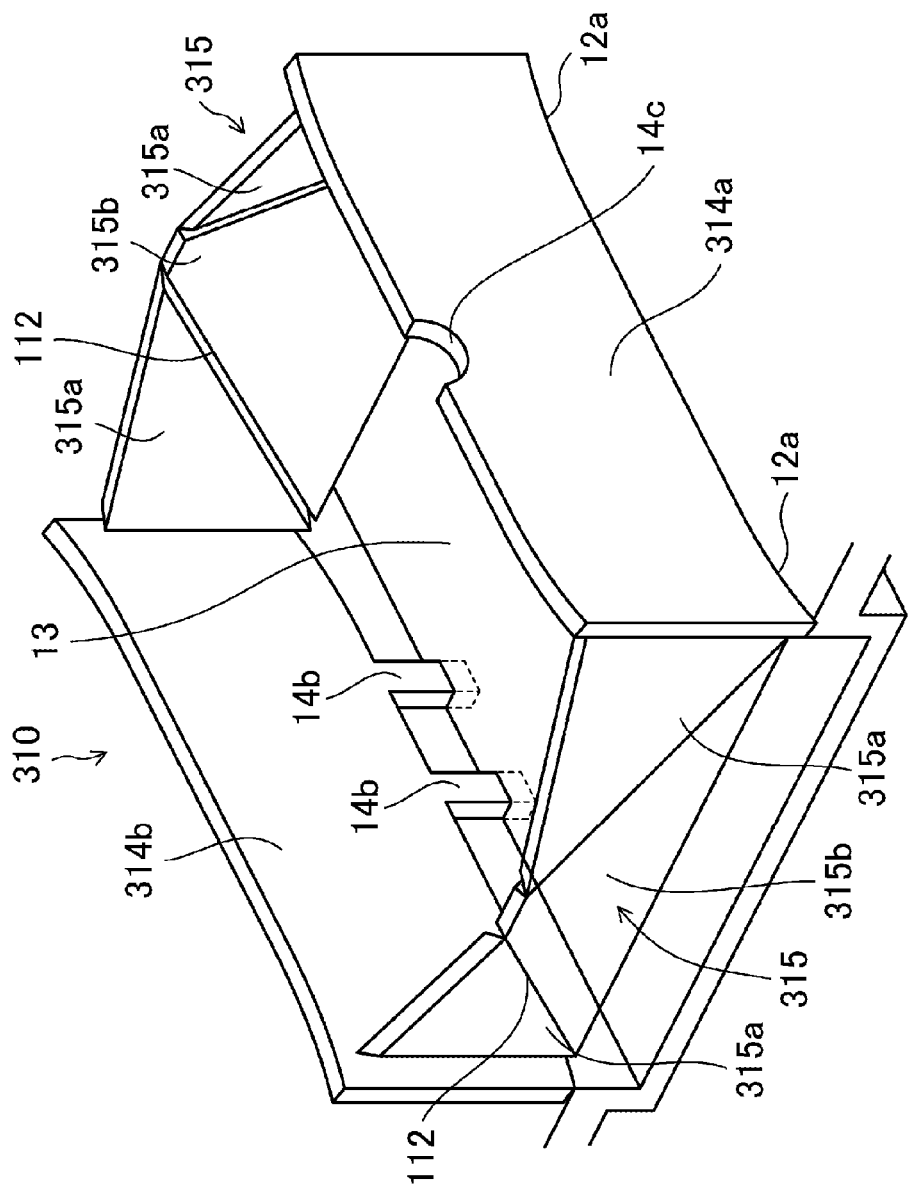
FIG. 19 is a perspective view showing a holding device in a raised state according to an embodiment of the present invention.

Further, legs 14b can also be provided on a side (a lower edge) of a top panel 114a and/or a top panel 114b as shown in FIG. 19. The procedures for raising and housing are the same as the second embodiment.

Each side panel is configured with three triangular side panels 115a and 815b as shown in FIG. 43. First triangular side panels 115a and the top panels 114a and 114b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, the first and second triangular side panels 115a and 815b are connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Third Embodiment

FIGS. 29-39 show a holding device 610 according to a third embodiment of the present invention. The holding device 619 is different from the second embodiment explained above mainly in the configuration of a raised-position holding member. Further, in the holding device 610 according to the third embodiment, a lower part (a lower edge) of one of the top panels slidably moves when the holding device 610 opens so as to be in the raised state. On the other hand, in the other of the top panels, a lower part (a lower edge) of the other of the top panels rotates with respect to a housing side of a housing recess 13 when the holding device 610 opens so as to be in the raised state. In other words, the lower part (a lower edge) of the other of the top panels does not slidably move when the holding device 610 opens so as to be in the raised state. As a result, the opening (raising) and closing (housing) operations of the top panel can be performed smoothly.

Figure 30:
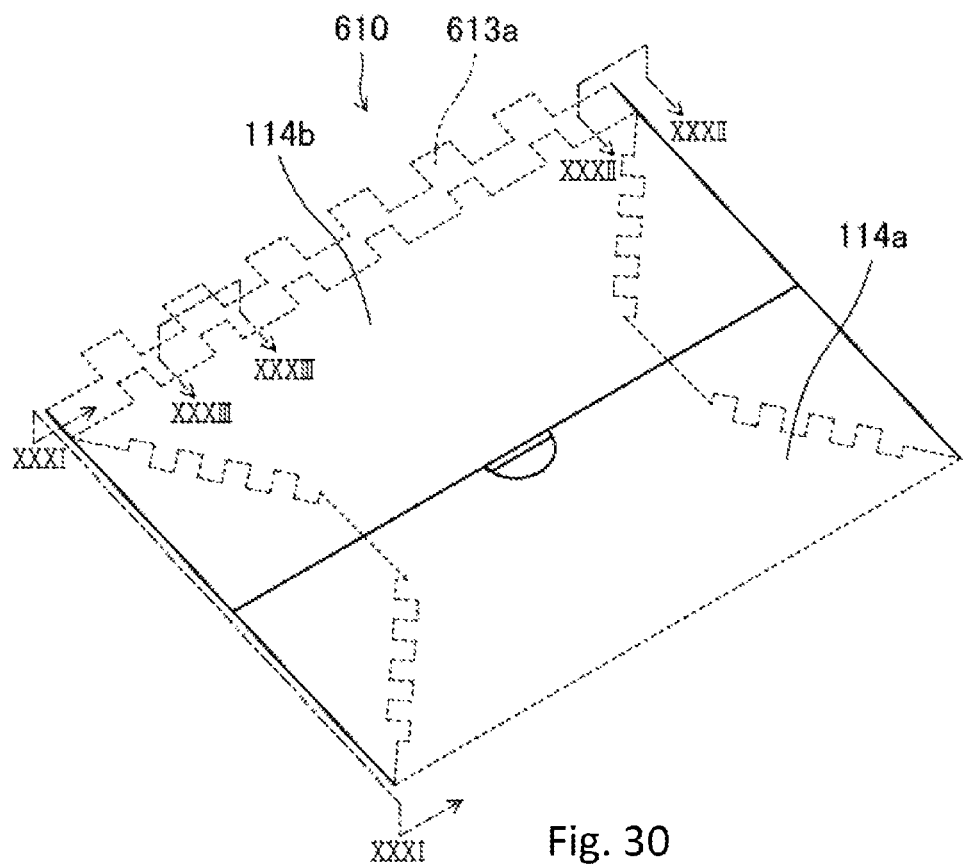
FIG. 30 is a perspective view showing the holding device shown in FIG. 29 according to the third embodiment of the present invention.

In this embodiment, a top panel 114 consists of a raisable first top panel 114a and a raisable second top panel 114b, each of which is supported so that it can swing centered on one of a pair of opposing edges (corresponding to the front and back edges of a housing recess 13). First top panel 114a and second top panel 114b form a flat top panel 114 when the holding device 610 is in the folded (housed) position. The surface of top panel 114 is covered with the same carpet material as the surrounding area, so it presents an attractive appearance. As shown in FIG. 30, under the carpet material 12, a cushion gap 316a is provided. Thus, when the holding device 610 is open, a bottom of the second top panel 114d slidably moves to an edge of the housing recess 13 of the floorboard. On the other hand, the bottom of the first top panel 114a is fixed to the other edge of the housing recess 13 of the floorboard. Therefore, opening and closing of top panel 114 can be done smoothly.

The pair of side panels 615 is foldably connected to both edges of first top panel 114a and second top panel 114 b. The pair of side panels 615 is formed of a lightweight sheet-like material with comparatively high stiffness such as a molded resin component or the like of thickness of roughly 12 mm, for example. When first top panel 114a and second top panel 114b are raised, the pair of side panels 615 are raised into mutually opposing positions and together with top panel 114 to form the holding device 610 in a rectangular parallelepiped shape.

Figure 29:
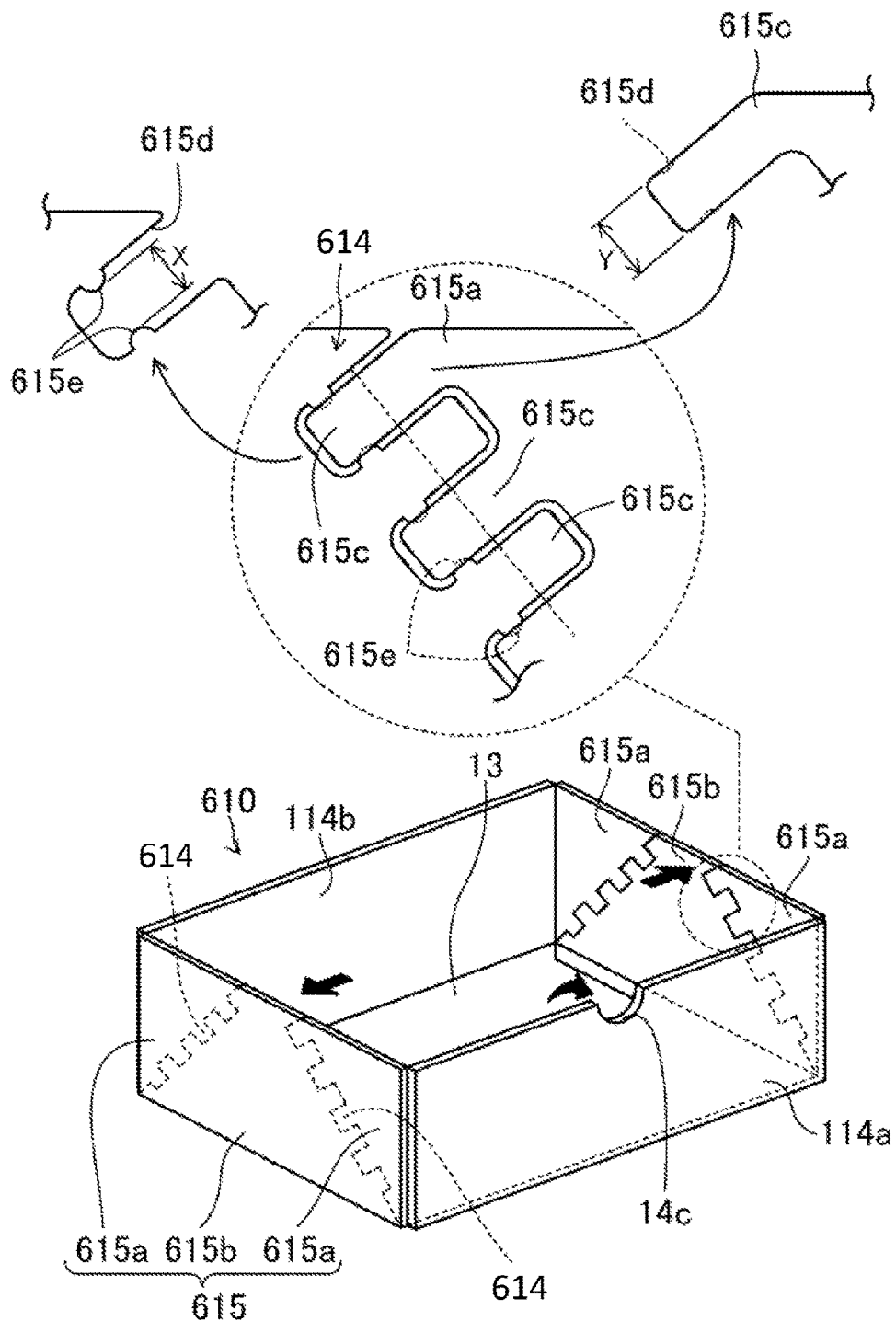
FIG. 29 is a perspective view and a partial enlarge view showing a holding device in a raised state according to a third embodiment of the present invention.

Specifically, in the present variation embodiment, as shown by the arrows of FIG. 29, first of all, after the first top panel 114a is raised, the side panels 615 are outwardly spread in the directions shown by the arrows. Thereafter, the raised state of the holding device 610 is maintained by the raised-position holding members. Each of the raised-position holding members according to the present variation embodiment is configured with comb tooth members 614. Specifically, the comb tooth members 614 are respectively formed on mating surfaces of the first triangular side panels 615a and the second triangular side panels 615b in the side panels 615. In a tooth member 615c of one of the comb tooth members 614, a tooth projection member 615e, which is fitted into a tooth slit member 615d of the other of the comb tooth members 614, is formed. As a result, the comb tooth members 614 can maintain the raised state of the side panels 615. A dimension X of the tooth projection member 615e is narrower than a width Y of the corresponding tooth member 615c as shown in FIG. 29.

Further, as shown in FIG. 30, a cushion gap 613a, which is in a form in which a projection and a recess are alternately arranged, is formed between a lower edge of the second top panel 114b and a housing side of the housing recess 13. Further, a configuration of the cushion gap 613a between the second top panel 114b and the housing recess 13 has a zigzag shape in a plan view so as to not extend linearly. As a result, the carpet material 12 is prevented from downwardly sinking into the gap when the holding device 610 is housed. This cushion gap 613a can be applied to any of the embodiments in the present application.

Figure 31:
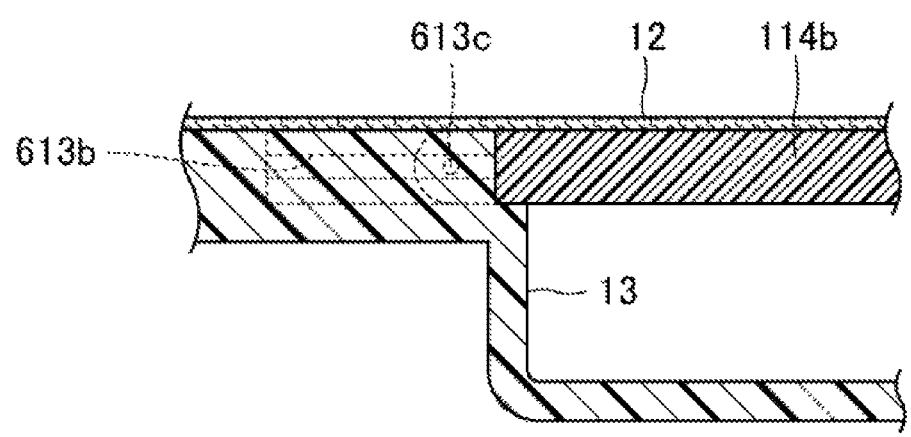
FIG. 31 is an enlarged cross section view along the XXXI-XXXI line of FIG. 30.
Figure 32:
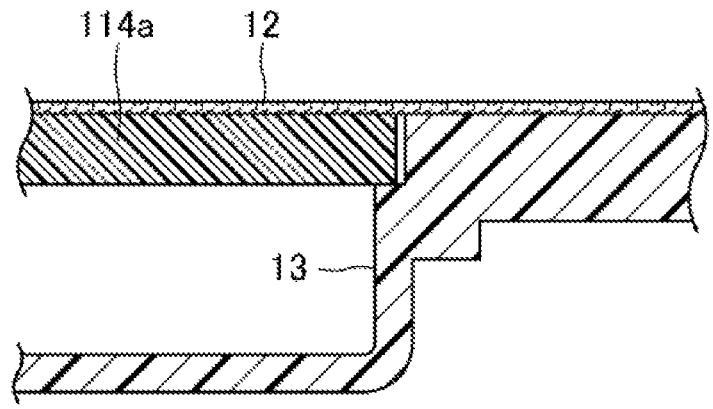
FIG. 32 is an enlarged cross section view along the XXXII-XXXII line of FIG. 30.
Figure 33:
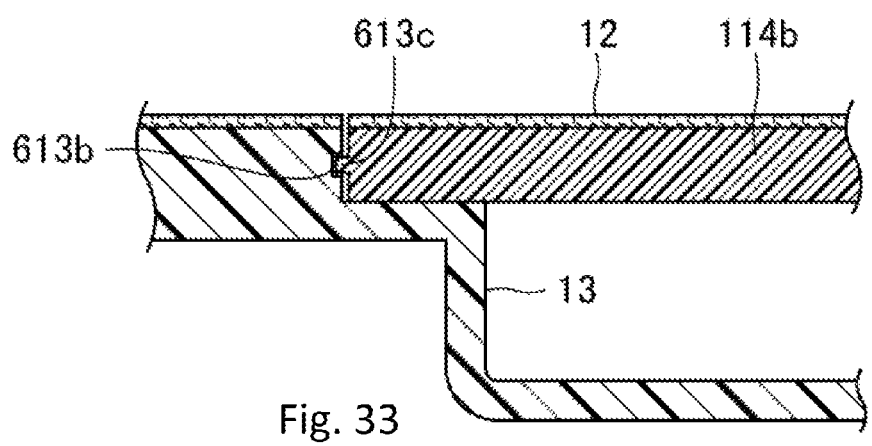
FIG. 33 is an enlarged cross section view along the XXXIII-XXXIII line of FIG. 30.
Figure 34:
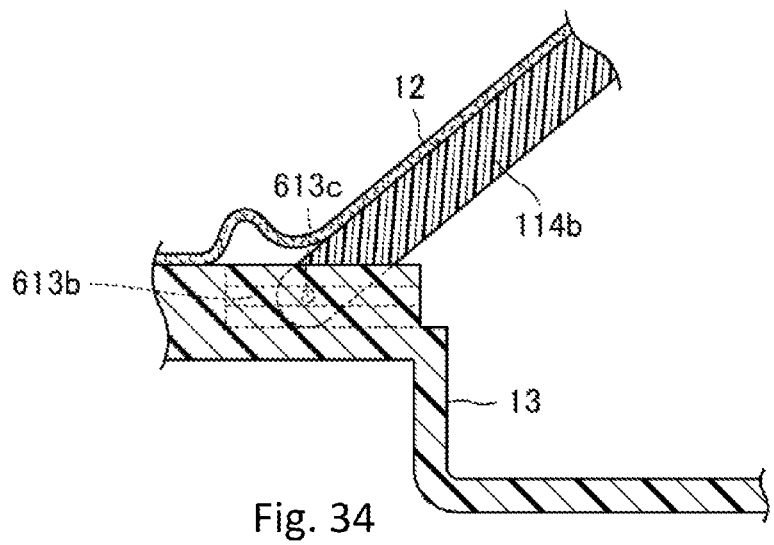
FIG. 34 is a partial cross section view in the middle of opening the holding device shown in FIG. 30.
Figure 35:
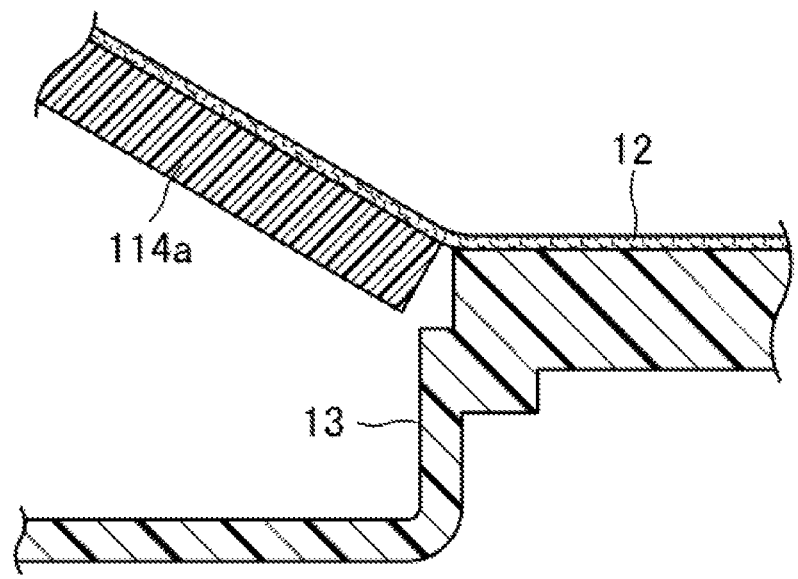
FIG. 35 is a partial cross section view in the middle of opening the holding device shown in FIG. 30.
Figure 36:
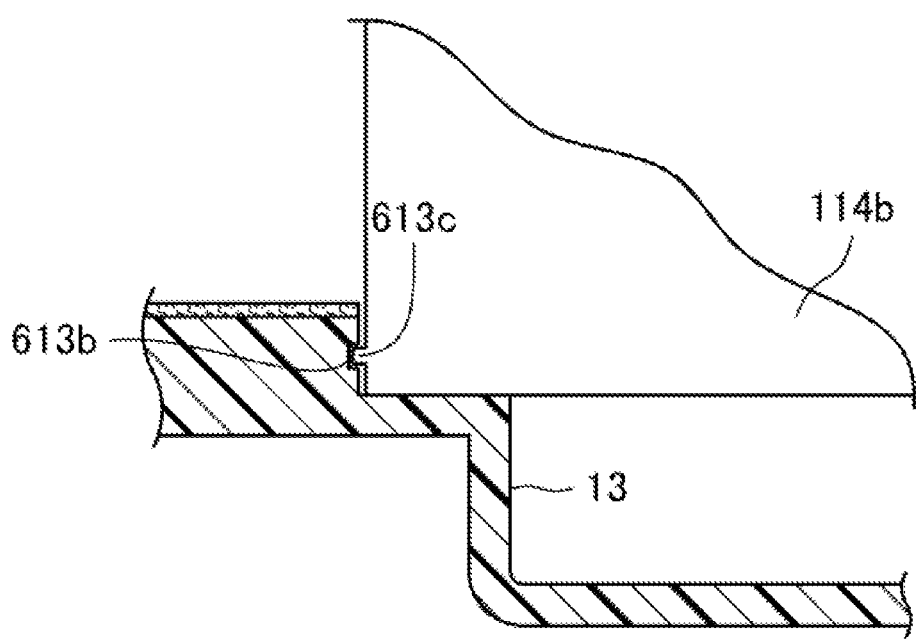
FIG. 36 is a partial cross section view in the middle of opening the holding device shown in FIG. 30.
Figure 37:
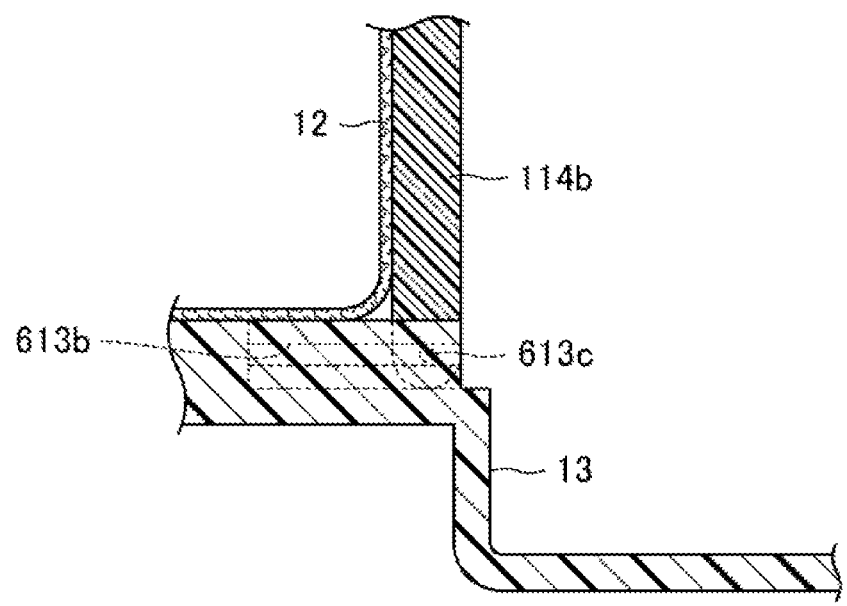
FIG. 37 is a partial cross section view showing the holding device in the raised state shown in FIG. 29.
Figure 38:
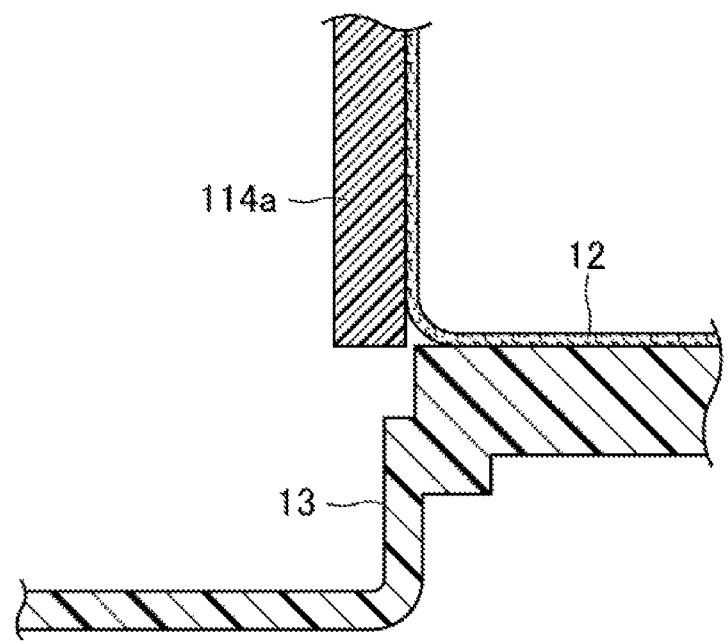
FIG. 38 is a partial cross section view showing the holding device in the raised state shown in FIG. 29.
Figure 39:
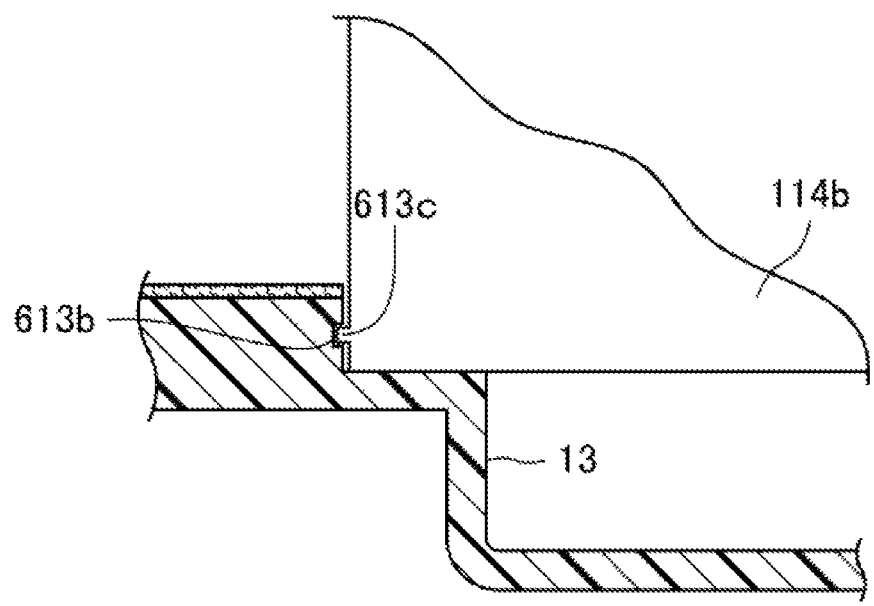
FIG. 39 is a partial cross section view showing the holding device in the raised state shown in FIG. 29.

Further, as shown in FIGS. 31-33, for instance, support pins 613c, which substantially horizontally project from the right to the left on the right and left side surfaces of the base end (a lower edge) of the second top panel 114b, are provided. Further, support grooves 613b, into which the support pins 613c are respectively fitted, are formed in the corresponding side walls of the housing recess 13.

On the other hand, a bottom of the first top panel 114a does not have a special mechanism as the bottom (the lower edge) of the second top panel 114b. The first top panel 114a can move because the carpet material 12 is formed on a top surface of the first top panel 114a and a top surface the floorboard so that the carpet material 12 movably connects the first top panel 114a and the floorboard. Therefore, as shown in FIGS. 34-39, because the opening/closing operation of the second top panel 114b becomes particularly stable, the opening/closing operation of the entire holding device 610 also becomes smooth.

As discussed in the above first and second embodiments and their variations, the top panels 114a and 114b, and sides of the side panels 615 (615a) can be connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

In addition, it is not limited to the above configuration that the first and second triangular side panels 615a and 615b are connected by the comb tooth member 614. The first and second triangular side panels 615a and 615b can be connected by a fabric material, such as the same as the carpet material 12, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Another Variation of Third Embodiment (a Provisional Application (March 2016) FIGS. 3-8 (FIGS. 58-63))

Figure 58:
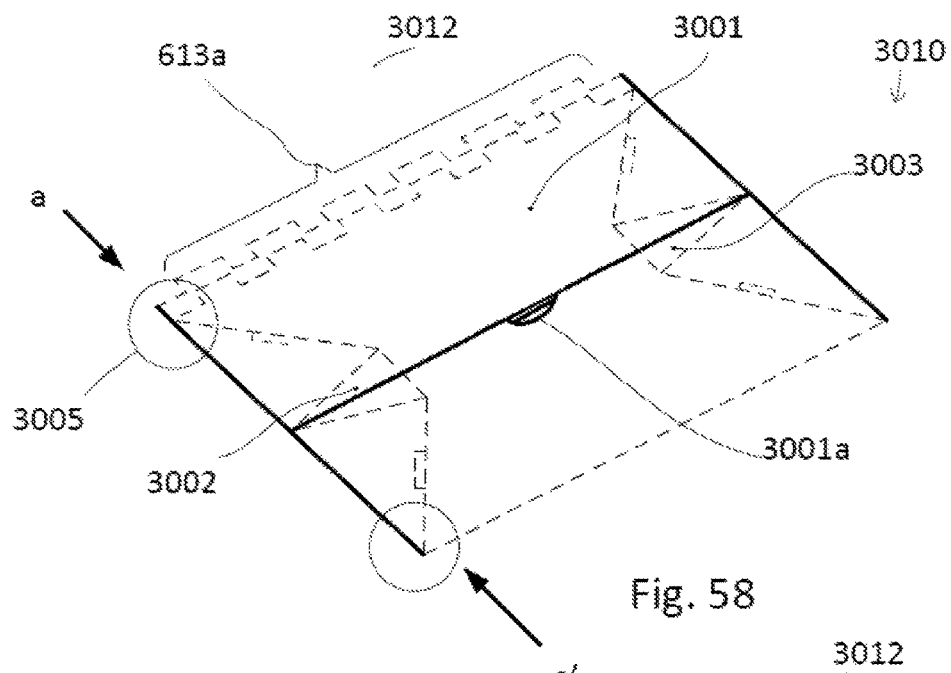
FIG. 58 is a perspective view showing a holding device in a housed state according to a variation of the third embodiment of the present invention.

FIGS. 58-63 show another variation of the third embodiment. A foldable holding device 3010 is mounted on or built in a luggage compartment or a trunk of an automobile as shown in FIG. 58. Because side panels 3002 and 3003 are embedded in a housing recess 3013 formed in a floorboard 3008, a top panel 3001 with a finger-holding point 3001a can be seen in a stored or housed state of the holding device 3010 of FIG. 58. The carpet material 3012 is formed on the top panel 3001 and other area of the floorboard 3008. Several legs, such as the legs 14b shown in the other drawings, are shown in a cushion gap 613a in FIG. 58. But, other detailed features, such as the connection methods between triangular side panels, of the holding device are omitted from the drawings because they are the same or similar to those described in the first and second embodiments. A feature of this variation of the third embodiment is a configuration of a bottom of the top panel 3001 located at a side of the cushion gap 613a.

Figure 59:
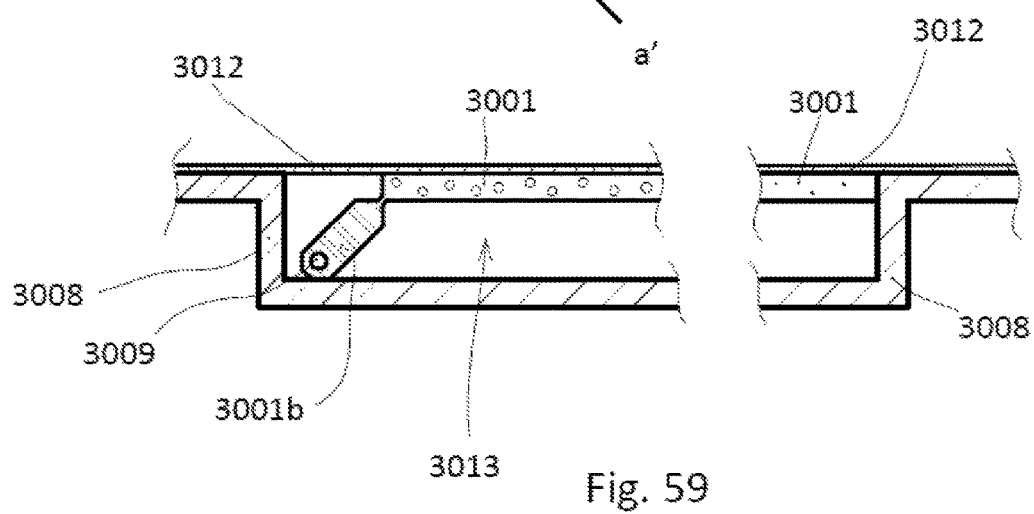
FIG. 59 is a partial cross section view showing the holding device shown in FIG. 58.
Figure 61:
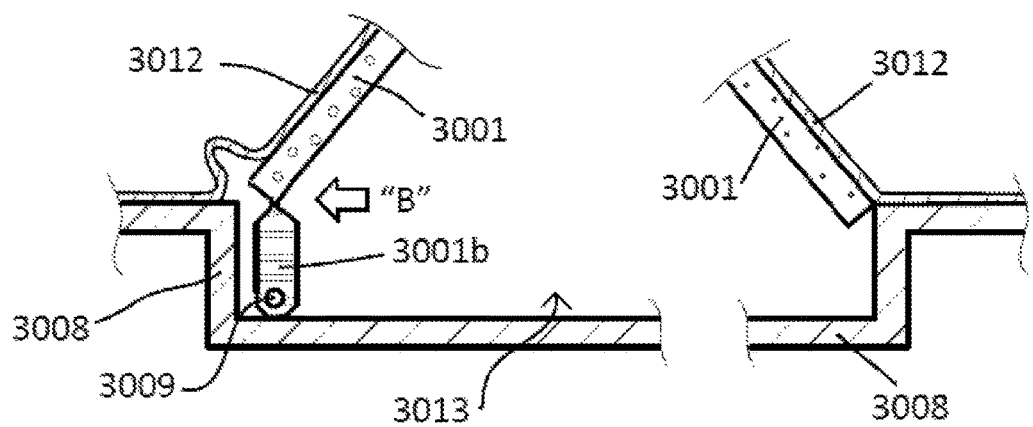
FIG. 61 is a partial cross section view showing a top panel, a pivot panel and a housing of the holding device shown in FIG. 60.
Figure 63:
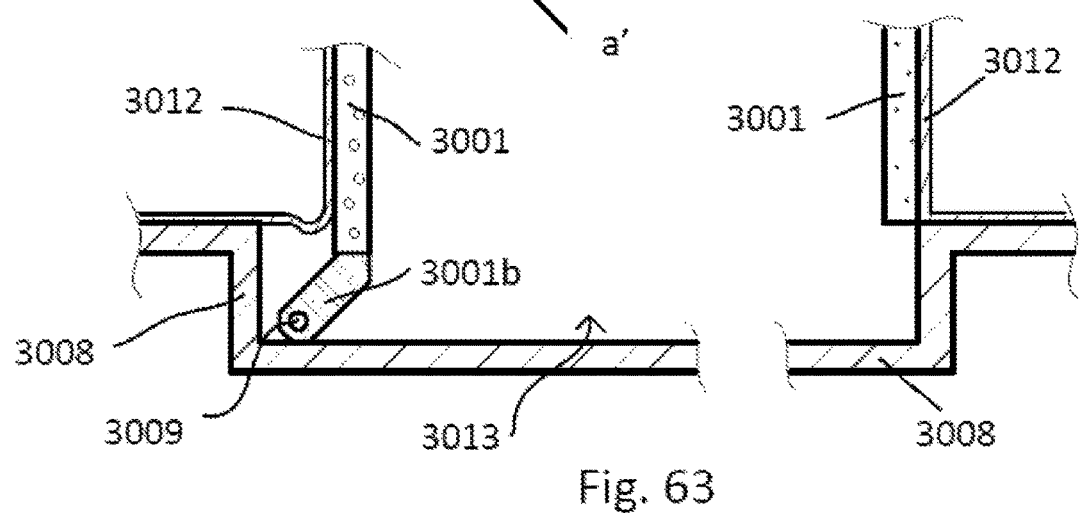
FIG. 63 is a partial cross section view showing a top panel, a pivot panel and a housing of the holding device shown in FIG. 62.

Specifically, as shown in FIG. 59, a pivot panel 3001b is provided in the housing recess 3013 and connected to the floorboard 3008 via a support pin 3009 as shown in the left side of FIGS. 59, 61 and 63. Although FIG. 59 shows only one support pin 3009, another support pin is provided the other side of the pivot panel 3001b. The pivot panel 3001b rotates with respect to the support pin 3009 when the holding device 3010 is open and close by moving the top panel 3001. In other words, the support pin 3009 is rotatable fixed to the housing recess 13. Alternatively, the support pin 3009 is rotatable fixed to the pivot panel 3001b. The pivot panel 3001b and the top panel 3001 is connected by a fabric material, such as the same as the carpet material 3012, hinges, such as the hinges 16, 416, or a spring, such as the coil spring 416a. Further, it is not limited to the support pin 3009 for movably connecting the pivot panel 3001b to the floorboard 3008. Other hinges or a fabric material can be used to movably connect the pivot panel 3001b to the floorboard 3008.

On the other hand, a bottom of the other of the top panel 3001 (shown in the right side of FIGS. 59, 61 and 63) does not have a special mechanism as the bottom of the top panel 3001 at the left side of FIGS. 59, 61 and 63. The other of the top panel 3001 moves because the carpet material 3012 is formed on a top surface of the top panel 3001 and a top surface the floorboard 3008 so that the carpet material 3012 movably connects the top panel 3001 and the floorboard 3008.

Figure 60:
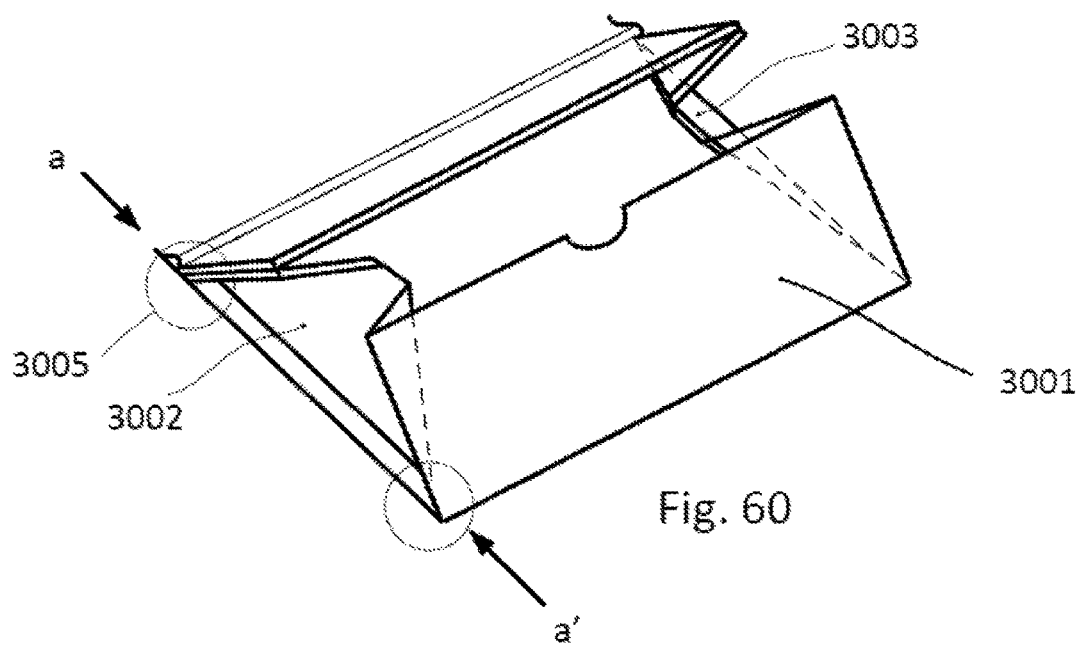
FIG. 60 is a perspective view in the middle of opening the holding device shown in FIG. 58.
Figure 62:
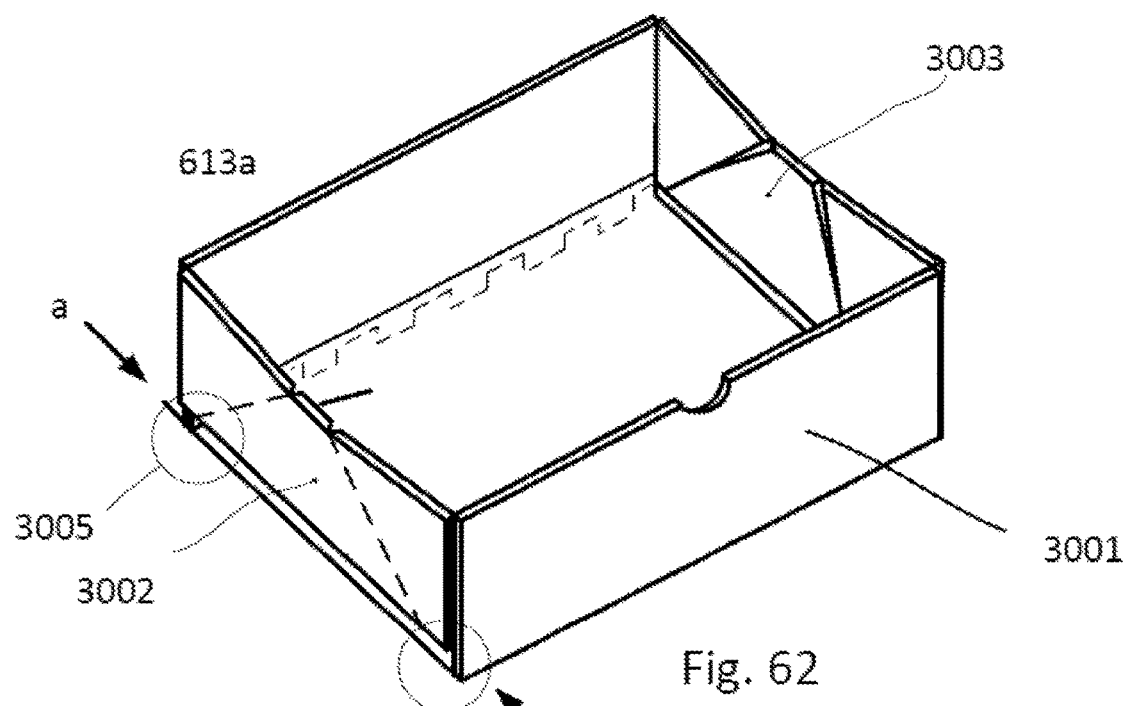
FIG. 62 is a perspective view showing the holding device in the raised state shown in FIG. 58.

FIGS. 58 and 59 show the holding device 3010 in a stored or housed state. FIGS. 60 and 61 show the holding device 3010 in a partially raised state. FIGS. 62 and 63 show the holding device 3010 in a fully raised or open state. Because the pivot panel 3001b moves from an inclined position (FIG. 59) to a perpendicular position (FIG. 61), and from the perpendicular position (FIG. 61) to the inclined position (FIG. 63), the top panel 3001 smoothly moves without any obstacle force. Therefore, open (raised) and close (stored or housed) operations of the holding device 3010 can be smoothly performed.

As discussed in the above first and second embodiments and their variations, the top panel 3001, and sides of the side panels 3002 and 3003 can be connected by a fabric material, such as the same as the carpet material 3012, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

Further, each of the side panels 3002 and 3003 is configured with three triangular side panels as shown in FIGS. 58, 60 and 62. These three triangular side panels can be connected by a fabric material, such as the same as the carpet material 3012, hinges, such as the hinges 16, 416, a spring, such as the coil spring 416a, or a magnet and a magnet-attractable fitting, such as a magnet 117a and a magnet-attractable fitting 117b of FIG. 10 and other drawings of the first and second embodiments and their variations.

In addition, in the present variation embodiment, side edges of any two of triangular side panels which face to each other have a unique configuration to prevent a finger from pinching between the side edges of any two of the triangular side panels when the triangular side panels are raised. These side edges have angled planes in which the corners are taken off as shown in FIG. 62. This feature can be used in other embodiments in the present application.

Another Embodiment

Figure 16:
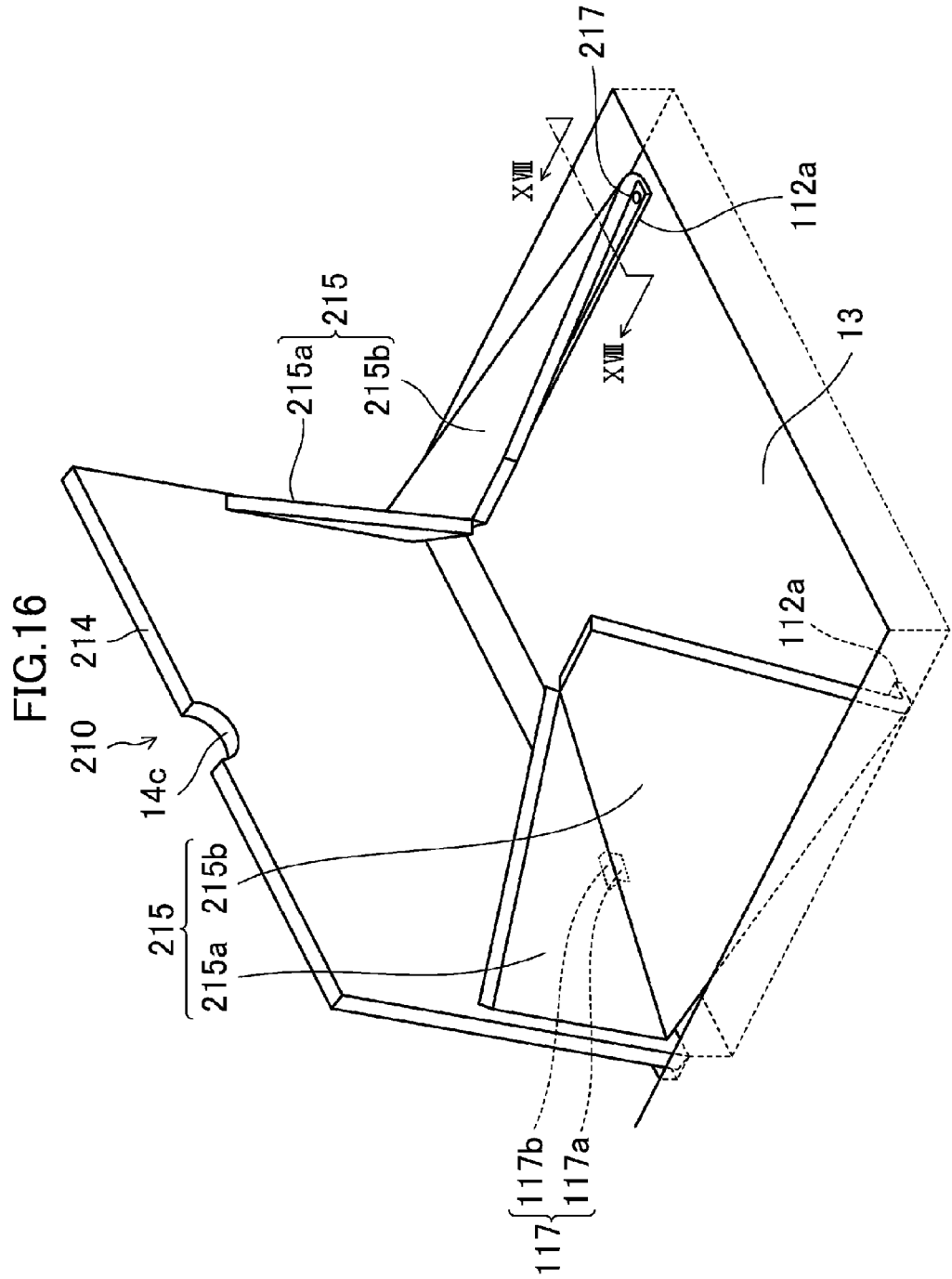
FIG. 16 is a perspective view showing the holding device in a partially raised state according to an embodiment of the present invention.
Figure 17:
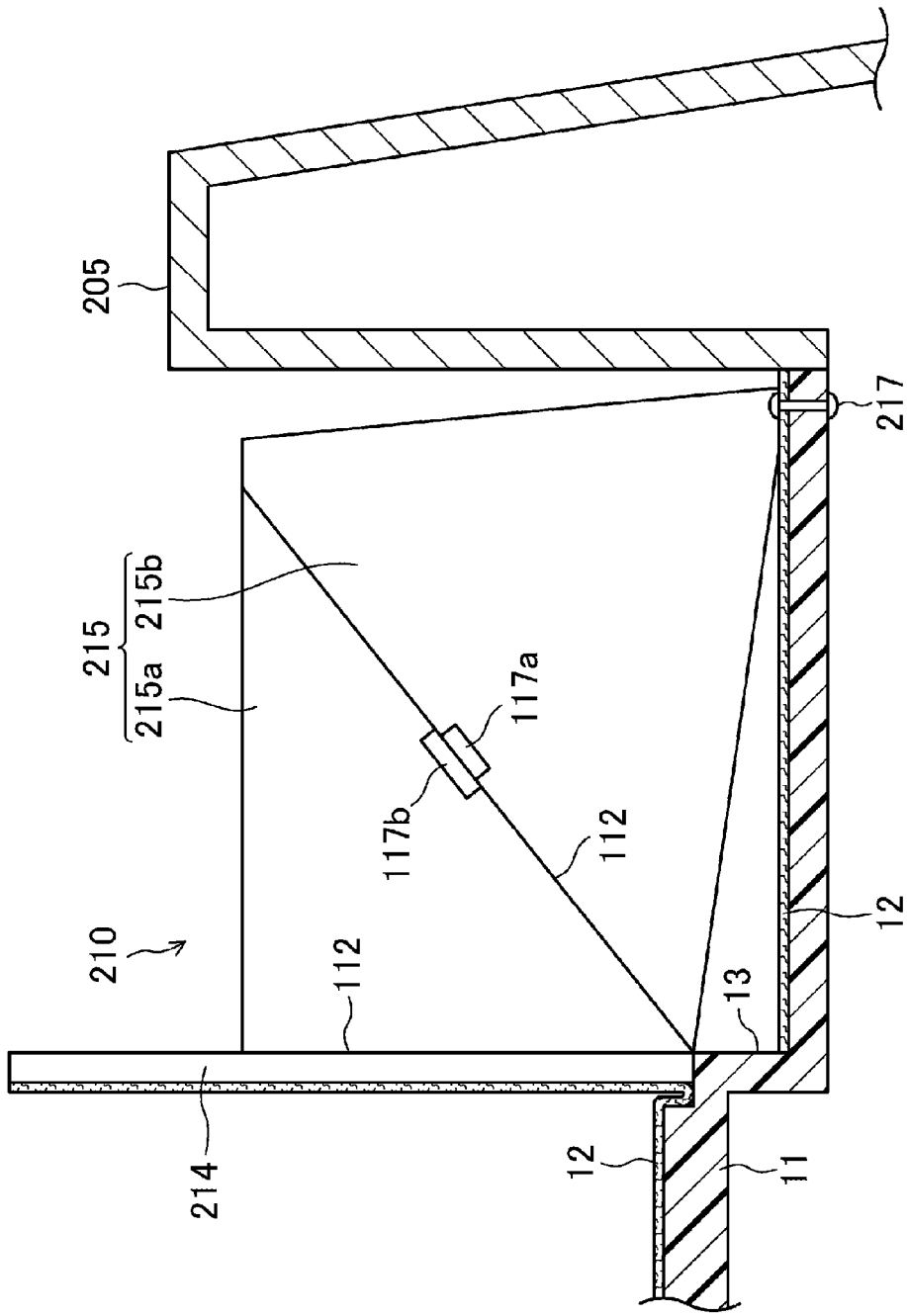
FIG. 17 is a cross section view showing the holding device of FIG. 16 in a fully raised position.
Figure 18:
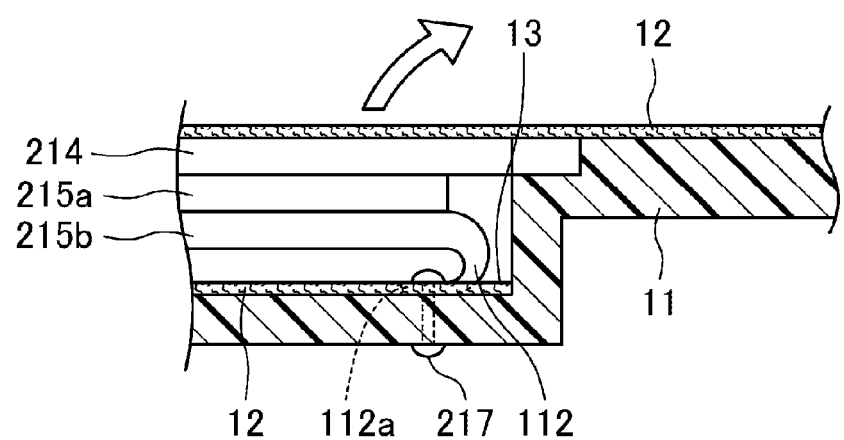
FIG. 18 is an enlarged cross section view along the XVIII-XVIII line of FIG. 16.

FIG. 16 through FIG. 18 show a holding device 210 according to another embodiment of the present invention, which differs from the first embodiment and the second embodiment mentioned above in that its form is different.

In this embodiment, a top panel 214 consists of a 1-panel top panel 214, similar to the first embodiment. And at both ends of the top panel 214, a pair of side panels 215 is respectively foldably connected. This pair of side panels 215 is formed of a light-weight sheet-like material with comparatively high stiffness such as a resin-molded component or the like, for example, and when the top panel 214 is raised, they are raised into mutually opposing positions and, working together with the top panel 214 and a trunk rear wall 205, form the holding device 210 in the shape of a rectangular parallelepiped.

The side panels 215 are foldably connected to one edge of the top panel 214, and are configured with generally triangularly shaped first and second triangular side panels 215a and 215b. In the present configuration, each of the first and second triangular side panel 215a and 215b is formed of a flat panel of roughly right-triangle shape. Each sloped edge of the first triangular side panel 215a and the second triangular side panel 215b is foldably connected. The second triangular side panel 215b has a trapezoidal shaped panel, for example, configured so that in the raised position the lower edge of each becomes a lower edge of the side panel 115.

In addition, the first triangular side panels 215a, the second triangular side panels 215b, and top panel 214, are foldably connected to each other by the flexible fabric components 112.

At the surfaces where the first triangular side panels 215a and the second triangular side panel 215b mate, raised-position support components 117 are provided.

One end 112a of the fabric components 112 is affixed to the bottom floor of the housing recess 13 by means of screws 217. In this manner, the pair of side panels 215, when in the raised position, cannot be removed from the housing recess 13. The method of affixing that one end 112a is not limited to the use of the screws 217.

Next, it will be described the use procedure for the floorboard 4 having the foldable holding device 210 according to the present embodiment.

Although not shown in the figures, in the housed position the pair of side panels 215 is underneath the top panel 214 and is held down by the weight of the top panel 214 itself, so that a flat state is maintained.

Next, when the top panel 214 is to be raised as in FIG. 16, a finger is applied to the finger-hold point 14c and the panel is pulled upward. By doing that, the first triangular side panels 215a which are connected to top panel 214 by means of the fabric components 112 are pulled up and as a result, the second triangular side panels 215b are also gradually raised.

When this is done, as shown in FIG. 17, the magnet 117a and the magnet-attractable fitting 117b are pulled together by the magnetic force, and almost automatically, by means of the magnetic force, the pair of side panels 215 rise, each becoming a flat panel. This position is maintained by the magnetic force. Moreover, in the present embodiment, these raised-position support components 117 may also be provided at the mating surfaces of the first triangular side panels 215a and top panel 214.

In this way, upon opening the device by pulling up the top panel 214, the pair of side panels 215 connected to it also open and, working together with the trunk rear wall 205, form the holding device 210 in the form of a rectangular parallelepiped. Each side panel 215 is formed of two foldable triangles and, when raised, the raised position is maintained by the raised-position support components 117. As a result, the holding device 210 readily becomes container shaped and that container-shaped state is maintained.

In reverse, when closing, one simultaneously pushes the pair of side panels 215 downward and inward. On the other hand, it is made so that even if an unintended force is applied to only one of the side panels 215, it will not close.

Consequently, with the floorboard 4 having the foldable holding device 210 according to this embodiment also, the holding device 210 can be readily raised to the container-shaped state and that container-shaped state can also be securely held.

Another Embodiment

Figure 20:
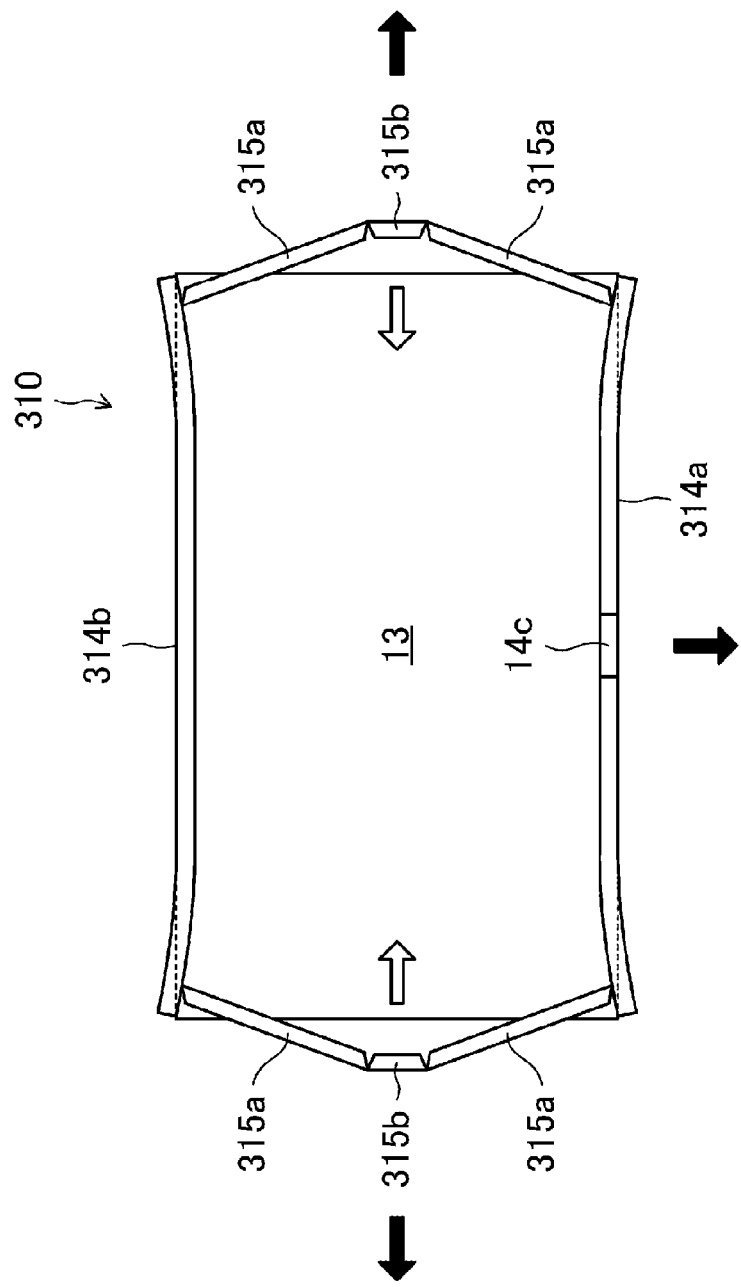
FIG. 20 is a plan view showing the holding device of FIG. 19 in the raised state.

FIG. 19 and FIG. 20 show a holding device 310 according to another embodiment of the present invention, which differs from above mentioned the second embodiment in that the configuration for supporting the raised position is different.

In other words, the basic configuration is generally the same as the second embodiment, but with the present embodiment, only in the center areas of the lower ends of first top panel 314a and second top panel 314b two legs 14b are provided for example, similar to the first embodiment. A first top panel 314a and a second top panel 314b have a sheet thickness on the order of from 5 mm to 7 mm, so that they can bow to a moderate extent.

In addition, side panels 315 are not provided with magnets 117a and magnet-attractable fittings 117b, but instead the pair of first triangular side panels 315a and second side panel 315b which constitute each of the side panels 315 when raised (when in the container-shaped state) have a dimensional relationship so that they bow to the outer sides of the left and right side edges of the housing recess 13. In other words, it is configured so that, by means of the side panels 315 bowing greatly to the outside when they are raised, the container-shaped state is maintained by means of the fabric components 112 which are stretched (they become the raised-position support components). In the carpet material 12, slits 12a are provided, and it is made so that both sides of first top panel 314a and second top panel 314b bow to a moderate extent and so that their lower edges can ride over the surface of the floorboard 4.

With this embodiment, because raised-position support components are not provided, as shown by the black arrows in FIG. 20, after the first top panel is raised, as the next step it is necessary to push the side panels 315 outwardly to the left and right using both hands.

When housing the holding device, if the side panels 315 at right and left are folded inward using both hands as shown by the outlined arrows in FIG. 20, the fabric components 112 begin to return to their original positions and by the operation of the weight of the first top panel 314a and the second top panel 314b themselves the holding device returns to the housed position. It is made so that even if an unintended force is applied to only one of the side panels 315, it will not close.

With the present embodiment, the raised-position support components 117 are not provided, so there are the advantages that the parts count is reduced and one can spread out the side panels 315 at one's own pace.

Consequently, with the floorboard 4 having the foldable holding device 310 according to this embodiment also, the holding device 310 can be readily raised to the container-shaped state and that container-shaped state can also be securely held.

With the above-mentioned embodiments, the following configurations may also be done.

That is, with each of the above-mentioned embodiments, the top panel 14, 114, 214 and the first top panel 314a and the second top panel 314b are connected to the areas surrounding the housing recess 13 of the floorboard 4 by means of the carpet material 12, but they may also be connected by mechanical hinges provided with an elastic component such as a spring or rubber and they may even be connected by both of those.

In addition, with each of the above-mentioned embodiments, the holding device 10, 110, 210 and 310 are configured with the pair of side panels 15, 115, 215, or 315, but if the housing recess 13 is provided in a position near one of the sidewalls, either left or right, of the luggage compartment 1, for example, it can be configured of only one, left or right, of the side panels 15, 115, 215, or 315.

Also, in the first embodiment, the hinges 16 are formed of a thin layer of the core material 14a, but they can be configured of hinges provided with an elastic component such as a spring or rubber. Furthermore, they can be formed of the carpet material 12 or of the flexible fabric material 112. In that case, when opening, the pair of side panels 15 is moved by hand and is made to pass over the side-panel holding protrusions 17. The configuration of the hinges 16 is not limited to these examples, but also may be done with a flexible material such as a tape.

Figure 50:
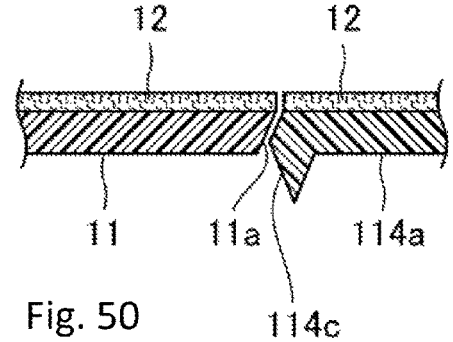
FIG. 50 is a partial enlarged cross section view showing an engagement structure of a top panel according to the other embodiment of the present invention.

Further, as shown in FIG. 50, when an engagement part 114c and an engaged part 11a, which moderately engage between the end of the top panel such as the top panel 114a and the side surface of the housing recess 13, are provided, the top panel does not unintentionally open due to a vibration or the like while a car is moving and an unstableness of the top panel with respect to the floorboard or the housing recess also hardly occurs.

Furthermore, the above embodiments are in essence preferred examples, and are in no way intended to limit the scope of the present invention, the articles it is applied to, or its application.

The scope of the invention, therefore, should be determined solely by the following claims.

The foldable holding device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A foldable holding device provided at a floorboard of a vehicle, the foldable holding device comprising:
  a housing recess that is provided at the floorboard;
  a raisable top panel that nests within the housing recess in a housed state, the raisable top panel having an upper edge, a lower edge and side edges;
  a side panel foldably connected to one of the side edges of the raisable top panel, the side panel being configured to outwardly move as the raisable top panel is raised and to form, together with the raisable top panel, an open state of the foldable holding device;
  a side panel holding member having a first holding sub-member and a second holding sub-member, the first holding sub-member being provided in the housing recess, the second holding sub-member being provided at a position located directly adjacent to a lower edge of the side panel, and the side panel holding member being configured to maintain a raised position of the side panel by engaging the first holding sub-member and the second holding sub-member with each other, wherein the first holding sub-member is a floorboard slot that is provided in a side wall of the housing recess, the second holding sub-member is a projection that is provided at a bottom of a side edge of the side panel, and the side edge of the side panel is located at a farthest position from the raisable top panel in the open state, and the projection slidably moves into the floorboard slot when the side panel moves outwardly to form, together with the raisable top panel, the foldable holding device in the open state.

2. The foldable holding device according to claim 1, wherein the one of the side edges of the raisable top panel and the side panel is connected by a spring that urges the side panel outwardly as the raisable top panel is raised.

3. The foldable holding device according to claim 1, further comprising:

a plurality of leg-holding members that are provided in the housing recess, wherein the raisable top panel has a plurality of legs that are continuously and outwardly formed from the lower edge of the raisable top panel so that a top surface of the raisable top panel, a top surface of the plurality of legs and a top surface of the floorboard form a planar surface while the raisable top panel is housed in the housing recess, and the plurality of leg-holding members respectively hold the plurality of legs as the raisable top panel is raised.

4. The foldable holding device according to claim 1, further comprising:

a plurality of leg-holding members that are provided in the housing recess, wherein the side panel has a plurality of legs that are continuously and outwardly formed from the lower edge of the side panel, and the plurality of leg-holding members respectively hold the plurality of legs as the raisable top panel is raised.

5. A foldable holding device provided at a floorboard of a vehicle, the foldable holding device comprising:

a housing recess that is provided at the floorboard;

a raisable top panel that nests within the housing recess in a housed state, the raisable top panel having an upper edge, a lower edge and side edges;

a side panel foldably connected to one of the side edges of the raisable top panel, the side panel being configured to outwardly move as the raisable top panel is raised and to form, together with the raisable top panel, an open state of the foldable holding device;

a side panel holding member having a first holding sub-member and a second holding sub-member, the first holding sub-member being provided in the housing recess, the second holding sub-member being provided at a position located directly adjacent to a lower edge of the side panel, and the side panel holding member being configured to maintain a raised position of the side panel by engaging the first holding sub-member and the second holding sub-member with each other, wherein the first holding sub-member is a projection that projects inwardly from a side wall of the housing recess, and the second holding sub-member is a through hole through which the projection is inserted when the foldable holding device is in the open state.

6. The foldable holding device according to claim 5, wherein the one of the side edges of the raisable top panel and the side panel is connected by a spring that urges the side panel outwardly as the raisable top panel is raised.

7. A foldable holding device provided at a floorboard of a vehicle, the foldable holding device comprising:

a housing recess that is provided at the floorboard;

a raisable top panel that nests within the housing recess in a housed state, the raisable top panel having an upper edge, a lower edge and side edges;

a side panel foldably connected to one of the side edges of the raisable top panel, the side panel being configured to outwardly move as the raisable top panel is raised and to form, together with the raisable top panel, an open state of the foldable holding device;

a side panel holding member having a first holding sub-member and a second holding sub-member, the first holding sub-member being provided in the housing recess, the second holding sub-member being provided at a position located directly adjacent to a lower edge of the side panel, and the side panel holding member being configured to maintain a raised position of the side panel by engaging the first holding sub-member and the second holding sub-member with each other, wherein the first holding sub-member is a support shaft that is provided in the housing recess and that extends parallel to a side wall of the housing recess, the second holding sub-member is a through hole that is provided at a bottom portion of a lower edge of the side panel, a through hole extending direction of the through hole is perpendicular to the lower edge of the raisable top panel, and the support shaft is located in the through hole, when the side panel is raised by rotating with respect to the support shaft, together with the raisable top panel, the foldable holding device is in the open state.

8. The foldable holding device according to claim 7, wherein the one of the side edges of the raisable top panel and the side panel is connected by a spring that urges the side panel outwardly as the raisable top panel is raised.

9. A foldable holding device that is provided at a floorboard of vehicle, the foldable holding device comprising:

a housing recess that is provided at the floorboard;

a raisable pair of top panels that nest within the housing recess in a housed state, the raisable pair of top panels stand when the raisable pair of top panels are outwardly opened, each of the raisable pair of top panels having side edges continuously extending between top and lower edges;

a pair of side panels respectively foldably connected to at least one of the side edges of each of the raisable pair of top panels, the pair of side panels being configured to move to mutually opposed positions as the raisable pair of top panels are raised and to form the holding device into a rectangular parallelepiped shape in a plan view, each lower edge of the pair of side panels being swingably supported by the floorboard so that the pair of side panels stand when the raisable pair of top panels are outwardly opened; and first and second side panel holding members, each of the first and second side panel holding members having a first holding sub-member and a second holding sub-member, the first holding sub-members being provided in the housing recess, each of the second holding sub-members being provided at a position located directly adjacent to the lower edge of each of the pair of side panels, and the first and second side panel holding members being configured to maintain a raised position of the pair of side panels by engaging the first holding sub-members and the second holding sub-members with each other, wherein one of the pair of side panels is configured with:
a first pair of triangular side panels that are generally triangularly shaped, a first edge of each of the first pair of triangular side panels being foldably connected to one of the side edges of each of the raisable pair of top panels, respectively;
a second triangular side panel, two edges of the second triangular side panel being respectively and foldably connected to two of second edges of the first pair of triangular side panels, and a lower edge of the second triangular side panel forms the lower edge of each of the pair of side panels; and
mating surfaces of the first pair of triangular side panels and the second triangular side panel being provided with a raised-position support component, wherein the first and second holding sub-members are magnets and magnet-attractable fittings.

10. The foldable holding device according to claim 9, wherein each of the first pair of triangular side panels has one of a magnet and a magnet-attractable fitting, and
when the pair of side panels are housed in the housing recess, the one of the magnet and the magnet-attractable fitting magnetically contacts to the second holding sub-member provided at the second triangular side panel.

11. A foldable holding device that is provided at a floorboard of a vehicle, the foldable holding device comprising:
a housing recess that is provided at the floorboard, the housing recess having first, second, third, and fourth housing sides, the first and third housing sides being respectively opposite to the second and fourth housing sides;
first and second raisable top panels that nest within the housing recess in a housed state, a first lower edge of the first raisable top panel being swingably and slidably supported by a first support member provided at the first housing side of the housing recess, a second lower edge of the second raisable top panel being swingably supported by the floorboard at the second housing side of the housing recess, the first and second raisable top panels being in a standing state when the first and second raisable top panels are outwardly opened-, each of the first and second raisable top panels having side edges continuously extending between one top edge and one of the first and second lower edges; and
a pair of side panels respectively foldably connected to at least one of the side edges of each of the first and second raisable top panels, the pair of side panels being configured to move to mutually opposed positions as the first and second raisable top panels are raised, and to form the holding device into a rectangular parallelepiped shape in a plan view, wherein one of the pair of side panels is configured with:
a first pair of triangular side panels that are generally triangularly shaped, a first edge of each of the first pair of triangular side panels being foldably connected to one of the side edges of each of the first and second raisable top panels, respectively;
a second triangular side panel, two edges of the second triangular side panel being respectively foldably connected to two of second edges of the first pair of triangular side panels, and a lower edge of the second triangular side panel forms a lower edge of each of the pair of side panels; and
mating surfaces of the first pair of triangular side panels and the second triangular side panel being provided with a raised-position support component, and
wherein the second raisable top panel is stationary with respect to the second housing side of the housing recess when the second raisable top panel is in the standing state.

12. The foldable holding device according to claim 11, wherein the raised-position support component comprises a comb tooth member which is provided at the mating surfaces.

13. The foldable holding device according to claim 12, wherein the comb tooth member includes a tooth member, a tooth projection member, and a tooth slit member,
the tooth projection member and the tooth slit member are respectively formed on the mating surfaces of the first pair of triangular side panels and the mating surfaces of the second triangular side panel so that the tooth projection member engages the tooth slit member when the first and second raisable top panels are in the stand state.

14. The foldable holding device according to claim 13, wherein a shortest inner distance of the tooth slit member parallel to one of the mating surfaces is smaller than a tooth projection width of the tooth projection member parallel to the one of the mating surfaces.

15. The foldable holding device according to claim 11, further comprising:
a plurality of leg-holding members that are provided at the first housing side of the housing recess,
wherein the first lower edge of the first raisable top panel has a plurality of legs that are continuously and outwardly formed from the first lower edge of the first raisable top panel, and
the plurality of leg-holding members respectively hold the plurality of legs as the first raisable top panel is in the stand state.

16. The foldable holding device according to claim 11, wherein the first support member is configured with first and second support pins and first and second support grooves, and the first and second support pins slidably move in the first and second support grooves,
the first and second support pins are respectively provided at first and second ends of the first lower edge of the first raisable top panel, and the first and second support pins are outwardly projected in an extending direction of the first lower edge,
the first and second support grooves are respectively provided at the third and fourth housing sides of the housing recess directly adjacent to the first housing side of the housing recess, and the first and second support grooves respectively extend in a direction parallel to an extending direction of one of the third and fourth housing sides of the housing recess, and
first positions of the first and second support pins when the first and second raisable top panels are in the standing state are closer to the housing recess than second positions of the first and second support pins when the first and second raisable top panels are housed in the housing recess, respectively.

17. The foldable holding device according to claim 16, wherein the first lower edge is rounded.

18. The foldable holding device according to claim 11, wherein the first raisable top panel is configured with a first main top panel and a pivot panel which are movably connected to each other at ends of the first main panel and the pivot panel, wherein the first support member is configured with first and second pins and the pivot panel, the first and second support pins are respectively provided at first and second ends of a lower edge of the pivot panel, and the first and second support pins outwardly project in an extending direction of the lower edge of the pivot panel, the pivot panel is movably connected to the housing recess via the first and second support pins, and when the first raisable top panel is housed in the housing recess as the housed state, the pivot panel is inclined with respect to a bottom of the housing recess, when the first raisable top panel is in a position between the standing state and the housed state, the pivot panel is perpendicular to the bottom of the housing recess, and when the first raisable top panel is in the standing state, the pivot panel is inclined with respect to the bottom of the housing recess.

19. The foldable holding device according to claim 18, wherein the pivot panel has first and second ends, the first end is connected to the first main panel, and the second end is located directly adjacent to the first and second support pins, the first end is configured with two planes, a boundary between the two planes is rotatably connected to a lower corner of the first lower edge of the first raisable top panel, and the second end is rounded.

* * * * *